US008087988B2

(12) United States Patent
Nguyen et al.

(10) Patent No.: US 8,087,988 B2
(45) Date of Patent: Jan. 3, 2012

(54) PERSONAL GAMING DEVICE AND METHOD OF PRESENTING A GAME

(75) Inventors: Binh T. Nguyen, Reno, NV (US); Craig A. Paulsen, Reno, NV (US); David H. Muir, Warnersby (AU)

(73) Assignee: IGT, Reno, NV (US)

(*) Notice: Subject to any disclaimer, the term of this patent is extended or adjusted under 35 U.S.C. 154(b) by 1068 days.

(21) Appl. No.: 10/871,876

(22) Filed: Jun. 17, 2004

(65) Prior Publication Data

US 2005/0130728 A1 Jun. 16, 2005

(51) Int. Cl.
*A63F 13/00* (2006.01)

(52) U.S. Cl. ........................................... 463/17; 463/42

(58) Field of Classification Search ............. 463/17–25, 463/40–42

See application file for complete search history.

(56) References Cited

U.S. PATENT DOCUMENTS

| | | | |
|---|---|---|---|
| 4,335,809 A | | 6/1982 | Wain |
| 4,467,424 A | | 8/1984 | Hedges et al. |
| 4,614,342 A | | 9/1986 | Takashima |
| 4,624,462 A | | 11/1986 | Itkis |
| 4,764,666 A | * | 8/1988 | Bergeron ........................ 463/25 |
| 4,837,422 A | | 6/1989 | Dethloff et al. |
| 4,856,787 A | | 8/1989 | Itkis |
| 5,038,022 A | | 8/1991 | Lucero |
| 5,048,831 A | | 9/1991 | Sides |
| 5,054,787 A | | 10/1991 | Richardson |
| 5,069,453 A | | 12/1991 | Koza et al. |
| 5,112,050 A | | 5/1992 | Koza et al. |
| 5,129,652 A | | 7/1992 | Wilkinson |
| 5,178,389 A | | 1/1993 | Bentley et al. |
| 5,218,356 A | | 6/1993 | Knapp |
| 5,242,163 A | | 9/1993 | Fulton |
| 5,265,874 A | | 11/1993 | Dickinson et al. |
| 5,324,035 A | | 6/1994 | Morris et al. |
| 5,342,047 A | | 8/1994 | Heidel et al. |
| 5,382,784 A | | 1/1995 | Eberhardt |
| 5,393,057 A | | 2/1995 | Marnell, II |
| 5,393,073 A | * | 2/1995 | Best |

(Continued)

FOREIGN PATENT DOCUMENTS

AT 184721 T 10/1999

(Continued)

OTHER PUBLICATIONS

Author unknown, Smart Cubicles, *Business Week*, Mar. 6, 2000.

(Continued)

*Primary Examiner* — Masud Ahmed
(74) *Attorney, Agent, or Firm* — Weaver Austin Villeneuve & Sampson LLP

(57) ABSTRACT

A mobile game device for selective display of one or more pre-purchased games of chance thereon. The game device includes a removable communication interface adapted to communicate with a central gaming system to selectively receive gaming data controlling the play and outcome of the pre-purchased game of chance, generated at a first time. The game device further includes a display screen, and one or more input mechanisms. A game device microprocessor device is provided which is configured to: commence play, selectively activated by operation of the one or more input mechanisms, of the pre-purchased games of chance using the gaming data at a selected second time after the first time; and selectively display on the display screen the generated outcome of the game of chance.

49 Claims, 12 Drawing Sheets

U.S. PATENT DOCUMENTS 5,557,086 A 9/1996 Schulze et al.
5,618,045 A 4/1997 Kagan et al.
5,630,586 A 5/1997 Lowden
5,643,086 A 7/1997 Alcorn et al.
5,655,966 A * 8/1997 Werdin et al.
5,678,886 A 10/1997 Infanti
5,709,603 A * 1/1998 Kaye .............................. 463/17
5,738,583 A 4/1998 Comas et al.
5,741,183 A 4/1998 Acres et al.
5,761,647 A 6/1998 Boushy
5,762,552 A 6/1998 Vuong et al.
5,768,382 A 6/1998 Schneier et al.
5,770,533 A 6/1998 Franchi
5,779,545 A 7/1998 Berg et al.
5,779,546 A 7/1998 Meissner et al.
5,795,228 A 8/1998 Trumbull et al.
5,797,085 A 8/1998 Beuk et al.
5,810,664 A * 9/1998 Clapper, Jr. .................... 463/17
5,851,149 A 12/1998 Xidos et al.
5,871,398 A * 2/1999 Schneier et al. ............... 463/16
5,905,523 A 5/1999 Woodfield et al.
5,915,023 A 6/1999 Bernstein
5,951,397 A 9/1999 Dickinson
5,970,143 A 10/1999 Schneier et al.
5,999,808 A 12/1999 LaDue
6,001,016 A 12/1999 Walker et al.
6,012,832 A 1/2000 Saunders et al.
6,012,983 A 1/2000 Walker et al.
6,019,283 A * 2/2000 Lucero
6,024,640 A * 2/2000 Walker et al. .................. 463/17
6,048,269 A 4/2000 Burns et al.
6,093,100 A * 7/2000 Singer et al.
6,099,408 A * 8/2000 Schneier et al. ............... 463/29
6,104,815 A * 8/2000 Alcorn et al.
6,105,008 A 8/2000 Davis et al.
6,106,396 A * 8/2000 Alcorn et al.
6,110,041 A 8/2000 Walker et al.
6,113,495 A 9/2000 Walker et al.
6,117,013 A 9/2000 Eiba
6,135,887 A 10/2000 Pease et al.
6,149,522 A * 11/2000 Alcorn et al.
6,178,510 B1 1/2001 O'Connor et al.
6,234,896 B1 5/2001 Walker et al.
6,264,559 B1 7/2001 Lawrence et al.
6,264,561 B1 7/2001 Saffari et al.
6,270,410 B1 8/2001 DeMar et al.
6,280,326 B1 8/2001 Saunders
6,285,868 B1 9/2001 LaDue
6,308,887 B1 10/2001 Korman et al.
6,319,122 B1 11/2001 Packes et al.
6,340,331 B1 1/2002 Saunders et al.
6,354,941 B2 3/2002 Miller et al.
6,394,907 B1 5/2002 Rowe
6,402,614 B1 6/2002 Schneier et al.
6,409,602 B1 6/2002 Wilshire et al.
6,416,414 B1 7/2002 Stadelmann
6,424,819 B1 7/2002 Yan
6,488,585 B1 12/2002 Wells et al.
6,508,709 B1 1/2003 Karmarkar
6,527,638 B1 3/2003 Walker et al.
6,554,707 B1 4/2003 Sinclair et al.
6,612,928 B1 9/2003 Bradford et al.
6,628,939 B2 * 9/2003 Paulsen
6,638,170 B1 * 10/2003 Crumby
6,645,077 B2 11/2003 Rowe
6,676,522 B2 * 1/2004 Rowe et al.
6,682,421 B1 * 1/2004 Rowe et al.
6,685,567 B2 2/2004 Cockerille et al.
6,761,636 B2 7/2004 Chung et al.
6,790,141 B2 * 9/2004 Muir
6,800,029 B2 * 10/2004 Rowe et al.
6,804,763 B1 10/2004 Stockdale et al.
6,837,789 B2 1/2005 Garahi et al.
6,843,725 B2 1/2005 Nelson
6,846,238 B2 1/2005 Wells
6,863,608 B1 3/2005 LeMay et al.
6,918,831 B2 * 7/2005 Nguyen et al.
6,942,570 B2 * 9/2005 Schneier et al.
6,964,611 B2 11/2005 Packes, Jr. et al.
6,971,956 B2 * 12/2005 Rowe et al.
6,988,946 B2 1/2006 Michaelson et al.
7,008,317 B2 3/2006 Cote et al.
7,037,193 B1 5/2006 Kasparov et al.
7,111,141 B2 9/2006 Nelson
7,116,782 B2 10/2006 Jackson et al.
7,384,339 B2 6/2008 LeMay et al.
7,510,474 B2 3/2009 Carter, Sr.
7,515,718 B2 4/2009 Nguyen et al.
7,850,528 B2 * 12/2010 Wells
7,918,728 B2 * 4/2011 Nguyen et al.
2001/0003100 A1 6/2001 Yacenda
2001/0039204 A1 11/2001 Tanskanen
2001/0041612 A1 11/2001 Garahi et al.
2002/0035538 A1 3/2002 Moreau
2002/0035605 A1 3/2002 McDowell et al.
2002/0042729 A1 4/2002 Yajima et al.
2002/0060243 A1 5/2002 Janiak et al.
2002/0066041 A1 5/2002 Lemke
2002/0068629 A1 6/2002 Allen et al.
2002/0069166 A1 6/2002 Moreau et al.
2002/0085515 A1 7/2002 Jaynes et al.
2002/0089410 A1 7/2002 Janiak et al.
2002/0094860 A1 7/2002 Itkis et al.
2002/0098883 A1 7/2002 Packes, Jr. et al.
2002/0098888 A1 7/2002 Rowe et al.
2002/0103008 A1 8/2002 Rahn et al.
2002/0111213 A1 8/2002 McEntee et al.
2002/0115487 A1 8/2002 Wells
2002/0119800 A1 8/2002 Jaggers et al.
2002/0193099 A1 12/2002 Paulsen
2003/0031321 A1 2/2003 Mages
2003/0040354 A1 2/2003 Itkis et al.
2003/0045341 A1 3/2003 Itkis et al.
2003/0064805 A1 4/2003 Wells
2003/0088880 A1 * 5/2003 Martinez et al.
2003/0104865 A1 * 6/2003 Itkis et al. ...................... 463/39
2003/0130029 A1 7/2003 Crumby
2003/0130039 A1 7/2003 Nelson
2003/0159044 A1 8/2003 Doyle et al.
2003/0171986 A1 9/2003 Itkis et al.
2003/0232647 A1 12/2003 Moser
2004/0002385 A1 1/2004 Nguyen
2004/0038723 A1 2/2004 Schneier et al.
2004/0048667 A1 3/2004 Rowe
2004/0053674 A1 3/2004 Nguyen et al.
2004/0053692 A1 3/2004 Chatigny et al.
2004/0137987 A1 7/2004 Nguyen et al.
2004/0180718 A1 * 9/2004 Uchida et al.
2004/0192439 A1 9/2004 Kula
2004/0209690 A1 10/2004 Bruzzese et al.
2004/0224741 A1 11/2004 Jen et al.
2004/0230639 A1 11/2004 Soluk et al.
2004/0235550 A1 11/2004 McNally et al.
2004/0242321 A1 12/2004 Overton
2005/0009600 A1 1/2005 Rowe et al.
2005/0059485 A1 3/2005 Paulsen et al.
2005/0097179 A1 5/2005 Orme
2005/0101383 A1 5/2005 Wells
2005/0107164 A1 5/2005 Muir et al.
2005/0143169 A1 6/2005 Nguyen et al.
2005/0164783 A1 7/2005 Paulsen et al.
2005/0181870 A1 8/2005 Nguyen et al.
2005/0239530 A1 * 10/2005 Walker et al. .................. 463/16
2006/0009275 A1 1/2006 Packes, Jr. et al.
2006/0019745 A1 1/2006 Benbrahim
2006/0035707 A1 2/2006 Nguyen et al.
2006/0058102 A1 3/2006 Nguyen et al.
2006/0068895 A1 3/2006 Nguyen et al.
2006/0111168 A1 5/2006 Nguyen et al.
2006/0211493 A1 9/2006 Walker et al.
2006/0281541 A1 12/2006 Nguyen et al.
2007/0101039 A1 * 5/2007 Rutledge et al.
2007/0207852 A1 9/2007 Nelson et al.
2008/0026844 A1 1/2008 Wells
2008/0076547 A1 3/2008 Bigelow et al.
2008/0076572 A1 3/2008 Nguyen et al.
2008/0108426 A1 5/2008 Nguyen et al.

| | | | |
|---|---|---|---|
| 2008/0182667 A1 | | 7/2008 | Davis et al. |
| 2008/0188308 A1 | | 8/2008 | Shepherd et al. |
| 2008/0234047 A1 | | 9/2008 | Nguyen |
| 2008/0298330 A1 | * | 12/2008 | Leitch |
| 2009/0170596 A1 | | 7/2009 | Gagner et al. |
| 2009/0291755 A1 | | 11/2009 | Walker et al. |

FOREIGN PATENT DOCUMENTS

| | | | | |
|---|---|---|---|---|
| AU | 4664296 | A | | 8/1996 |
| AU | 199871427 | | * | 4/1998 |
| AU | 199954012 | | * | 4/2000 |
| AU | 2001249901 | | * | 10/2001 |
| AU | 2001255746 | | * | 11/2001 |
| BR | 9606847 | A | | 11/1997 |
| CA | 2 211 297 | A1 | | 8/1996 |
| CA | 2273458 | | | 1/2000 |
| CA | 2 302 548 | A1 | | 5/2000 |
| CA | 2 211 297 | C | | 8/2002 |
| CN | 1174620 | A | | 2/1998 |
| CN | 1098510 | C | | 1/2003 |
| CZ | 9702296 | A3 | | 12/1997 |
| CZ | 294 347 | B6 | | 12/2004 |
| DE | 195 02 613 | A1 | | 1/1996 |
| DE | 195 02 613 | | * | 8/1996 |
| DE | 199 22 862 | A1 | | 5/1999 |
| EP | 0 024 184 | A2 | | 2/1981 |
| EP | 0631247 | | | 12/1994 |
| EP | 0 649 102 | A2 | | 4/1995 |
| EP | 0 744 786 | A1 | | 11/1996 |
| EP | 0 806 024 | A1 | | 11/1997 |
| EP | 0 924 657 | A2 | | 6/1999 |
| EP | 0 806 024 | B1 | | 9/1999 |
| EP | 1 028 551 | A2 | | 8/2000 |
| EP | 1 045 346 | A2 | | 10/2000 |
| EP | 1 059 742 | A1 | | 12/2000 |
| EP | 1 059 742 | A4 | | 5/2001 |
| EP | 1 231 577 | | | 8/2002 |
| FI | 973046 | A | | 9/1997 |
| GB | 2 151 054 | A | | 7/1985 |
| GB | 2 161 008 | | | 1/1986 |
| GB | 2161629 | | | 1/1986 |
| GB | 2 284 913 | A | | 6/1995 |
| HU | 9800695 | A2 | | 7/1998 |
| JP | 10512984 | T | | 12/1998 |
| JP | 2002-530006 | T | | 9/2002 |
| NO | 973355 | A | | 9/1997 |
| NO | 316247B | B1 | | 12/2003 |
| PL | 321544 | A1 | | 12/1997 |
| RU | 2132569 | C1 | * | 6/1999 |
| RU | 2144264 | C1 | | 1/2000 |
| RU | 2145116 | | | 1/2000 |
| RU | 2174258 | C2 | | 9/2001 |
| SK | 101397 | A3 | | 2/1998 |
| SK | 284750B | B6 | | 11/2005 |
| WO | WO93/10508 | | | 5/1993 |
| WO | WO95/24689 | | | 9/1995 |
| WO | WO96/00950 | | | 1/1996 |
| WO | WO96/23289 | A1 | | 8/1996 |
| WO | WO98/58509 | | | 12/1998 |
| WO | WO99/23594 | | * | 5/1999 |
| WO | WO99/34599 | | | 7/1999 |
| WO | WO99/42964 | | | 8/1999 |
| WO | WO99/51313 | | * | 10/1999 |
| WO | WO00/28680 | A1 | | 5/2000 |
| WO | WO00/31982 | | | 6/2000 |
| WO | WO-A-00/41428 | | | 7/2000 |
| WO | WO-A-00/49731 | | | 8/2000 |
| WO | WO00/67213 | | | 11/2000 |
| WO | WO00/79467 | | * | 12/2000 |
| WO | WO01/00291 | A1 | | 1/2001 |
| WO | WO01/01379 | A1 | | 1/2001 |
| WO | WO01/03786 | | | 1/2001 |
| WO | WO01/48712 | A1 | | 7/2001 |
| WO | WO01/54091 | | * | 7/2001 |
| WO | WO01/74461 | | * | 10/2001 |
| WO | WO01/76710 | A2 | | 10/2001 |
| WO | WO02/055163 | | | 7/2002 |
| WO | WO02/101486 | | * | 12/2002 |
| WO | WO02/102483 | A1 | | 12/2002 |
| WO | WO02/103550 | | * | 12/2002 |
| WO | WO03/005743 | | * | 1/2003 |
| WO | WO03/008057 | | | 1/2003 |
| WO | WO03/019486 | | | 3/2003 |
| WO | WO03/027970 | | | 4/2003 |
| WO | WO2005/031666 | A1 | | 4/2005 |
| WO | WO2006/009791 | | | 1/2006 |
| WO | WO 2006/085269 | | * | 8/2006 |
| WO | WO2006/138064 | | | 12/2006 |
| WO | WO2008/030928 | | * | 3/2008 |

OTHER PUBLICATIONS

Author unknown, Call My Agent, *Business Week*, Mar. 6, 2000.

Author unknown, The Tube, *Business Week*, Mar. 6, 2000.

"Examination Report from related European Application No. 04788976.1-1238," Jul. 20, 2006, 3 pages.

Office Action from Corresponding Foreign Application No. 2,454,581, dated Jun. 4, 2007, 3 pages.

PCT Application No. PCT/US2004/031315 Written Opinion dated Jan. 19, 2005.

Office Action of Sep. 21, 2006 from U.S. Appl. No. 10/672,307, 21 pages.

Office Action of May 8, 2007 from U.S. Appl. No. 10/672,307, 18 pages.

PCT Application No. PCT/US2005/021350 International Search Report dated Sep. 19, 2005.*

PCT Application No. PCT/US2005/021350 Written Opinion dated Sep. 19, 2005.*

International Search Report and Written Opinion from International Application No. PCT/US2006/021230, Sep. 29 2006, 10 pages.

State of Nevada wireless gaming regulations, http://gaming.nv.gov/documents/pdf/techpolicy_06may18.pdf, downloaded Sep. 6, 2006.

Palm M100 specifications, downloaded from www.palm.com, Sep. 6, 2006.

Advisory Office Action of related Russian Patent Application No. 2003136277/09(039251), May 26, 2006, 5 pages.

Office Action of Feb. 15, 2006 from U.S. Appl. No. 10/672,307, pp. 1-18.

US Office Action dated Apr. 3, 2003 issued in U.S. Appl. No. 09/967,326.

US Office Action Final dated Oct. 20, 2003 issued in U.S. Appl. No. 09/967,326.

US Office Action (Advisory Action) dated Feb. 4, 2004 issued in U.S. Appl. No. 09/967,326.

US Office Action dated Feb. 25, 2004 issued in U.S. Appl. No. 09/967,326.

US Notice of Allowance dated Sep. 20, 2004 issued in U.S. Appl. No. 09/967,326.

US Office Action dated Nov. 2, 2006 issued in U.S. Appl. No. 11/014,150.

US Notice of Allowance dated Feb. 8, 2007 issued in U.S. Appl. No. 11/014,150.

US Office Action dated Aug. 6, 2007 issued in U.S. Appl. No. 11/014,150.

US Office Action Final dated Mar. 26, 2008 issued in U.S. Appl. No. 11/014,150.

US Office Action (Examiner Interview Summary) dated Aug. 28, 2008 issued in U.S. Appl. No. 11/014,150.

US Office Action Final dated Dec. 3, 2008 issued in U.S. Appl. No. 11/014,150.

US Office Action Final dated Jul. 30, 2009 issued in U.S. Appl. No. 11/014,150.

US Office Action Final dated Dec. 15, 2008 issued in U.S. Appl. No. 11/888,326.

US Office Action (Notice of Abandonment dated) Jun. 10, 2009 issued in U.S. Appl. No. 11/888,326.

US Office Action Final dated Jul. 31, 2002 issued in U.S. Appl. No. 09/882,558.

US Office Action Final dated Feb. 21, 2003 issued in U.S. Appl. No. 09/882,558.

US Notice of Allowance dated May 9, 2003 issued in U.S. Appl. No. 09/882,558.

US Office Action (Examiner Interview Summary) dated Jun. 20, 2006 issued in U.S. Appl. No. 10/672,307.
US Office Action Final dated Oct. 11, 2007 issued in U.S. Appl. No. 10/672,307.
US Office Action dated May 1, 2008 issued in U.S. Appl. No. 10/672,307.
US Office Action (Examiner Interview Summary) dated Nov. 19, 2008 issued in U.S. Appl. No. 10/672,307.
US Office Action (Examiner Interview Summary) dated Feb. 27, 2009 issued in U.S. Appl. No. 10/672,307.
US Notice of Allowance dated Jul. 6, 2009 issued in U.S. Appl. No. 10/672,307.
US Office Action dated Oct. 9, 2009 issued in U.S. Appl. No. 11/155,702.
PCT International Search Report dated Sep. 23, 2003 issued in PCT/US02/31061.
PCT International Written Opinion dated Nov. 10, 2003 issued in PCT/US02/31061.
PCT International Preliminary Examination Report dated Jan. 19, 2004 issued in PCT/US02/31061.
AU Examiner's Report No. 1 dated Aug. 30, 2007 issued in AU Application No. 2002348579.
AU Examiner's Report No. 2 dated Sep. 22, 2008 issued in AU Application No. 2002348579.
AU Examiner's Report No. 3 dated Dec. 18, 2008 issued in AU Application No. 2002348579.
AU Examiner's Report No. 4 dated Mar. 30, 2009 issued in AU Application No. 2002348579.
EP Examination Report dated Aug. 3, 2004 issued in EP Application No. 02 782 084.4.
EP Office Action dated Nov. 18, 2005 issued in EP Application No. 02 782 084.4 (9 pages).
EP Summons to Attend Oral Proceedings EP Office Action dated Nov. 24, 2006 issued in EP Application No. 02 782 084.4.
EP Result of Consultation Office Action dated Mar. 22, 2007 issued in EP Application No. 02 782 084.4.
EP Result of Consultation dated Jul. 5, 2007 issued in EP Application No. 02 782 084.4.
EP Extended Search Report dated Jun. 6, 2007 issued in EP Application No. 07 005 397.0.
EP Summons to Attend Oral Proceedings dated Apr. 14, 2008 issued in EP 07 005 397.0-2221.
EP Examination dated Nov. 7, 2007 issued in EP Application No. 07 005 397.0-2221.
EP Result of Consultation dated Jan. 28, 2009 issued in EP Application No. 07 005 397.0-2221.
EP Decision to Refuse a European patent application dated Mar. 3, 2009 issued in EP Application No. 07 005 397.0-2221.
EP Extended Search Report dated Jan. 30, 2008 issued in EP 07 015 979.3-2221.
EP Communication re Examination dated Jun. 6, 2008 issued in EP 07 015 979.3-2221.
EP Summons to Attend Oral Proceedings dated Apr. 30, 2009 issued in EP 07 015 979.3-2221.
RU Office Action dated Sep. 12, 2006 issued in RU Application No. 2004/109515/09 (010378). (including list of references therein as provided by Russian Associate).
RU Office Action dated Feb. 8, 2007 issued in RU Application No. 2004/109515/09.
PCT International Search Report dated Sep. 19, 2005 issued in PCT/US2005/021350.
PCT International Preliminary Report on Patentability and Written Opinion dated Sep. 18, 2005 issued in PCT/US2005/021350.
PCT International Preliminary Examination Report dated Sep. 11, 2003 issued in PCT/US2002/18861.
PCT International Search Report dated Oct. 29, 2002 issued in PCT/US02/188861.
PCT Written Opinion dated Apr. 8, 2003 issued in PCT/US02/18661.
AU Examiner's First Report dated Mar. 9, 2006 issued in AU Application No. 2002347362.
CA Office Action dated Sep. 5, 2008 issued in CA Application No. 2,454,581.
CA Office Action dated Sep. 3, 2009 issued in CA Application No. 2,454,581.
EP Supplementary Search Report dated Dec. 4, 2008 issued in EP 02 752 049.3-2221.
RU Advisory Office Action dated Sep. 19, 2006 issued in RU Application No. 2003136277/09.
RU Grant of Patent dated Apr. 9, 2007 issued in RU Application No. 2003136277/09.
PCT International Search Report dated Jan. 19, 2005 issued in PCT/US2004/031315.
CN Office Action dated May 16, 2008 issued in 2004800276444.
CN Office Action dated Apr. 24, 2009 issued in 2004800276444.
EP Summons to Attend Oral Proceedings dated Jan. 30, 2009 issued in EP 04 788 976.1.
PCT International Search Report dated Sep. 29, 2006 issued in PCT/US2006/021230 (WO 2006/138064).
PCT International Preliminary Examination Report and Written Opinion dated Sep. 29, 2006 issued in PCT/US2006/021230 (WO 2006/138064).
EP Examination Report dated May 4, 2009 issued in EP 06 760 619.4-1238.
Patent Abstracts of Japan vol. 2000, No. 22, Mar. 9, 2001 & JP 2001 146058 A (SATO Corp), May 29, 2001 abstract.
Anonymous: "EM5007W Multimedia Cassiopeia-Yellow", Casio.com, [Online], Aug. 2, 2001, XP002430868, Retrieved from the Internet: URL:http://web.archive.org/web/2001080165446/www.casio.com/personalpcs/product.cfm?section=19&product=1972> [retrieved on Apr. 24, 2007].
Anonymous: "E-125 Cassiopeia", Casio.com, [Online] XP002430869, Retrieved from the Internet: url:http://web.archive.org/web/20011004012420/www.casio.com/personalpcs/product.cfm?section=19&product=3553.
Gigaset CL4 SIMpad Siemens.com, description [Online] Jun. 25, 2001, XP002430870 Retrieved from Internet: URL:http://web.archive.org/web/20010625204821/www.mysiemens.com/MySiemens/CDA/Standard/Frameset/0.1649.3_SIMPADCL_0_0_61_0,FF.html (3 pages).
http://de.wikipedia.org/wiki/SIMpad (1 page, in German).
Internet/Intranet Information Appliance: Brilliant 15 Screen in Compact, Space saving Design, DT Research, Inc., www.dtresearch.com Oct. 2000, 2 pages.
Laptop.pdf as copied from Wikipedia (http://en.wikipedia.org/wiki/Laptop), 22 pages, [Retrieved from the Internet on Nov. 23, 2008].
PCI Local Bus.pdf as redirected from Mini PCI from search on Wikipedia (http://en.wikipedia.org/wiki/MiniPCI), [Retrieved from Internet on Nov. 29, 2008], 15 pages.
The definition of graphical, *The American Heritage®* Dictionary of the English Language, *Third Edition*, copyright 1992 by Houghton Mifflin Company.
Wireless LAN.pdf as copied from Wikipedia (http://en.wikipedia.org/wiki/Wireless_LAN), [Retrieved from the Internet on Nov. 23, 2008], 12 pages.
Wireless network.pdf as copied from Wikipedia (http://en.wikipedia.org/wiki/wireless_network), [Retrieved from Internet on Sep. 24, 2009] 4 pages.
Wireless router.pdf as copied from Wikipedia (http://en.wikipedia.org/wiki/Wireless_router), [Retrieved from the Internet on Nov. 29, 2008], 3 pages.
US Notice of Allowance dated Feb. 2, 2010 issued in U.S. Appl. No. 11/014,150.
US Office Action (Miscellaneous Communication to Applicant-No Action Count) dated Mar. 23, 2010 issued in U.S. Appl. No. 11/014,150.
US Office Action (Miscellaneous Communication to Applicant-No Action Count) dated Jan. 5, 2010 issued in U.S. Appl. No. 10/672,307.
US Notice of Allowance dated Jan. 22, 2010 issued in U.S. Appl. No. 10/672,307.
U.S. Office Action dated Aug. 22, 2002 issued in U.S. Appl. No. 09/882,559.
U.S. Office Action Final dated Jan. 27, 2003 issued in U.S. Appl. No. 09/882,559.

U.S. Notice of Allowance dated Jul. 16, 2003 issued in U.S. Appl. No. 09/882,559.
EP Commencement of Proceedings before the Board of Appeal dated Jul. 30, 2009 issued in EP Application No. 07 005 397.0-2221.
AU Examiner's First Report dated Sep. 7, 2009 issued in AU Application No. 2004277242.
CN Third Office Action dated Oct. 16, 2009 issued in 2004800276444.
EP Search Report dated Nov. 18, 2009 issued in EP 09 15 9225.3 (EP 2 083 402 A3).
CN First Office Action dated Oct. 16, 2009 issued in 200680021769.5.
PCT International Preliminary Examination Report dated Aug. 22, 2003 issued in PCT/US02/18875 (WO02/103550).
PCT International Search Report dated Sep. 12, 2002 issued in PCT/US02/18875 (WO02/103550).
PCT Written Opinion dated Feb. 24, 2003 issued in PCT/US02/18875 (WO02/103550).
AU Examiner's First Report dated Mar. 23, 2007 issued in AU 2002322096.
Au Examiner's Second Report dated Oct. 23, 2007 issued in AU 2002322096.
AU Notice of Opposition dated Apr. 6, 2009 issued in AU 2002322096.
AU Statement of Grounds and Particulars dated Jul. 3, 2009 issued in AU 2002322096.
AU Notice Opposition has been Withdrawn dated Aug. 19, 2009 issued in AU 2002322096.
European Supplementary Search Report dated Dec. 4, 2008 issued in EP 02 756 187.7-2221.
European Examination Report dated Mar. 2, 2009 issued in EP 02 756 187.7-2221.
RU Advisory Office Action dated May 31, 2006 issued in RU 2003136278/09.
RU Resolution on Granting dated Oct. 4, 2006 issued in RU 2003136278/09.
PCT International Search Report dated Mar. 13, 2008 issued in PCT/US2007/077714 (WO08/030928).
PCT International Preliminary Report on Patentability and Written Opinion dated Mar. 10, 2009 issued in PCT/US2007/077714 (WO08/030928).
EP Examination Report dated Jun. 24, 2009 issued in EP 07 841 947.0.
EP Examination Report dated Nov. 25, 2009 issued in EP 07 841 947.0.
Palermo, Vincent, "Near-filed magnetic comms emerges", Digital TV DesignLine.com.
US Notice of Allowance dated Jul. 8, 2010 issued in U.S. Appl. No. 11/014,150.
US Miscellaneous Communication dated Jul. 21, 2010 issued in U.S. Appl. No. 11/014,150.
US Miscellaneous Communication dated Sep. 9, 2010 issued in U.S. Appl. No. 11/014,150.
US Notice of Allowance dated May 10, 2010 issued in U.S. Appl. No. 10/672,307.
US Miscellaneous Communication dated Jun. 15, 2010 issued in U.S. Appl. No. 10/672,307.
US Office Action Final dated Jul. 14, 2010 issued in U.S. Appl. No. 11/155,702.
US Office Action dated Sep. 2, 2010 issued in U.S. Appl. No. 11/698,329.
US Office Action dated Aug. 17, 2010 issued in U.S. Appl. No. 11/518,342.
CA Examination Report dated Sep. 7, 2010 issued in CA Application No. 2,461,881.
EP Communication of the Registry dated Apr. 20, 2010 issued in EP Application No. 07 005 397.0-2221.
EP Communication of the Registry dated Jun. 24, 2010 issued in EP Application No. 07 005 397.0-2221.
AU Examiner's report No. 2 dated Sep. 7, 2010 issued in AU Application No. 2004277242.
CN Fourth Office Action dated May 28, 2010 issued in 2004800276444.
EP Communication re Examination dated Jun. 16, 2010 issued in EP 09 15 9225.3 (EP 2 083 402 A3).
Artobolevsky, I.I. (1976) *Polytechnic dictionary*, Moscow, Soviet Encyclopedia, p. 426.
Norenkov et al. (1998) "Telecommunication technologies and networks", Moscow, Publishing House of the Moscow State Technical University named after Bauman, 7:30.
US Office Action Final dated Dec. 7, 2010 issued in U.S. Appl. No. 11/155,702.*
US Office Action dated Apr. 6, 2011 issued in U.S. Appl. No. 11/155,702.*
US Notice of Allowance dated Sep. 12, 2011 issued in U.S. Appl. No. 11/155,702.*
US Office Action Final dated Feb. 4, 2011 issued in U.S. Appl. No. 11/698,329.*
US Office Action Final dated Feb. 3, 2011 issued in U.S. Appl. No. 11/518,342.*
US Notice of Allowance dated Apr. 5, 2011 issued in U.S. Appl. No. 11/518,342.*
US Notice of Allowance dated Sep. 28, 2011 issued in U.S. Appl. No. 11/518,342.
AU Examiner's first report dated Jun. 17, 2011 issued in AU Application No. 2009212922.
CA Examination Report dated Jun. 13, 2011 issued in CA Application No. 2,461,881.
EP Summons to oral proceedings pursuant to Rule 115(1) EPC dated Aug. 8, 2011 issued in EP Application No. 07 005 397.0.
CA Office Action dated Oct. 29, 2010 issued in CA Application No. 2,454,581.
AU Examiner's first report dated Oct. 11, 2010 issued in AU 2006259733.
AU Examiner's Report No. 2 dated May 3, 2011 issued in AU 2006259733.
AU Examiner's first report dated Aug. 5, 2011 issued in AU 2007292255.

* cited by examiner

PASSIVE MOBILE GAMING METHOD (VERIFICATION AND GAME PLAY)

PERSONAL GAMING DEVICE AND METHOD OF PRESENTING A GAME

RELATED APPLICATION

This application related to U.S. application Ser. No. 10/672,307, filed Sep. 26, 2003, and entitled PERSONAL GAMING DEVICE AND METHOD OF PRESENTING A GAME, which is a continuation-in-part of U.S. Pat. No. 6,628,939, issued Sep. 30, 2003, and entitled PERSONAL GAMING DEVICE, each of which is incorporated by reference.

FIELD OF THE INVENTION

The present invention relates to gaming systems, and more particularly relates to a mobile gaming systems and devices.

BACKGROUND OF THE INVENTION

Gaming is ever more popular, and casinos and other gaming establishments continually seek new and exciting ways to present games for play. Currently, games are generally presented on large free-standing gaming devices, such as the well known slot machine and video poker machines. Some games are presented at other than a gaming device, such as the table games of craps, blackjack and roulette. In addition, games such as keno and bingo may be played from tables in areas specially configured to present the game to players (such as in an area where personnel are arranged to pick up keno cards and called numbers are displayed on large displays).

A substantial disadvantage to the way such games are currently presented is that a player may participate in a game in only certain specified locations. For example, in order to play video poker, a player may be required to travel through a large hotel/casino to a specific gaming area where the video poker machine is located.

Gaming operators desire to provide to their customers greater accessibility to gaming devices and the opportunity to play games.

SUMMARY OF THE INVENTION

One aspect of the invention is a personal gaming device adapted to present a game to a player. In one embodiment, the personal gaming device is a part of a gaming system. The invention also comprises various methods of presenting a game to a player via the personal gaming device, reconciling game results, and verifying a personal gaming device for use.

In one embodiment, the personal gaming device includes a display screen, a processing unit including a processor and a memory, and a wireless communication interface associated with the processing unit. The wireless communication interface is adapted to receive data and provide it to the processing unit, and is also adapted to transmit data provided by the processing unit. In one or more embodiments, the received information comprises game data generated at a remote location which is used by the gaming device to present a game to the player.

In one or more embodiments, the personal gaming device is a hand-held device which has a body which houses the processing unit and other electronics. The personal gaming device may include a card reader for reading a magnetic stripe, smart card data or other encoded information, such as credit card information. The personal gaming device may also include a speaker for outputting game sound to a player.

In one embodiment, the personal gaming device is detachable from or operable independent of remote devices or networks. In other words, a network connection may or may not be present or be required when the personal gaming device is being operated.

In one embodiment, data may, instead of or in addition to being transmitted via the wireless communication interface, be transmitted and/or received through another type of communication interface, such as a cabled RS-232, USB or IEEE-1394 connection, or an infrared transmitter/receiver.

The personal gaming device preferably includes means for a player to provide play input. In one embodiment, the display may be touch-sensitive. The personal gaming device may also include buttons or include a microphone for accepting voice input.

In one embodiment, the personal gaming device is associated with a gaming system including a game data server. The processing unit receives game data from a remote location, such as the game data server, via the wireless communication interface and utilizes the game data to present a game to the player, including presenting game video information on the display. In one embodiment, the gaming device includes a player input and the processing unit transmits said input to a remote location via the wireless communication interface.

In one embodiment, a personal gaming device interface serves as an interface between the personal gaming device and one or more devices, including the game data server. The personal gaming device interface may also be associated with other networks and devices, including an Internet gateway, a hotel reservation system, a funds transaction network, or other networks and devices. In this manner, a player may use the personal gaming device to gain access to services, browse the Internet, and engage in other activities or obtain information than simply playing a game.

In a preferred embodiment, if the player wishes to play a game, the player is required to place a bet or ante to participate in winnings (i.e. a casino-type game or wagering game). In that event, a player provides credit, such as by swiping a credit card or a player tracking card associated with a player financial account. If the player's credit is verified, then the player is permitted to play a game or games as selected by the player. The game server generates game data regarding the game to be played, such as video and sound data. This information is transmitted to the personal gaming device, where game video and sound are presented to the player. As necessary, a player may provide input regarding a player's decisions relating to the game, such as via the touch-sensitive screen or a button.

In one embodiment, the personal gaming device stores resident game code. This game code is useful in presenting a game, but alone is incapable of presenting a game. A game server is configured to generate information regarding game results. The game results data is provided to the personal gaming device and used with the resident game code to present a game.

In one embodiment, the game result data or information comprises numerical data generated at least in part by one or more psuedo random number generators. The game results data or information may also include paytable or other such data as required to enable the process.

In one embodiment, a player may "pre-purchase" game play. In this embodiment, a player provides payment for wagers. The amount of the payment, coupled with the size of the wager for each game, determines the number of games the player may play. The game server is configured to generate game results data for the number of games the player has paid for.

The game results data may be transmitted to the personal gaming device via a wireless communication link. In another embodiment, the game results data is stored on a portable storage device such as a smart card or portable memory module which is capable of being read by the personal gaming device.

One embodiment of the invention comprises a method of activating a personal gaming device. Activation information is generated at a first location, such as by a game server. This activation information is transmitted, such as via a network of wireless transmitters. If the personal gaming device detects the activation information, the personal gaming device is activated, and if not, the device is deactivated. In one embodiment, the activation information is either transmitted at intervals, or is transmitted continuously and confirmed at various intervals.

In another aspect of the present invention, a game device is provided for selective display of a pre-purchased game of chance. The game device includes a communication interface adapted to communicate with a central gaming system to selectively receive gaming data controlling the play and outcome of the pre-purchased game of chance, generated at a first time. The unit includes a display screen, one or more input mechanisms, and a game device microprocessor device. This processor is configured to: 1) commence play, selectively activated by operation of the one or more input mechanisms, of the pre-purchased game of chance using the gaming data at a selected second time after the first time; and 2) selectively display on the display screen the generated outcome of the game of chance.

Accordingly, in this aspect of the present invention, one or more games of chance are pre-purchased and pre-executed on the central gaming system (e.g., a backend server), at the first time, the play and outcome of which can subsequently played and viewed on the remote gaming device at a second time, after the first time. The pre-purchased games of chance, thus, are fully executed in a secure gaming environment or system (e.g., a central gaming system), and then transferred, in the form of pre-viewed gaming data, to the remote gaming device for a complete replay execution of the play and outcome of the games of chance at the player's leisure on their remote gaming device. In essence, the play and outcome of the pre-purchased games of chance are "known" and ratified at the server side prior to play and viewing on the gaming device. Once the pre-viewed gaming data is transferred to the remote gaming device, the gaming device is simply applied to view the play and outcomes of the games of chance.

On one basic level, a video clip (or clips) of the gaming play and outcome is transferred or downloaded to the mobile gaming device from the server for time-shifted replay thereof at the second time. The gaming device is essentially relegated to a viewing mechanism that eliminates any player input, other than perhaps just pressing a button to enable one to view what happens in the next frame 'sequence' of the video clip.

In one configuration, the communication interface includes a removable peripheral device adapted for selective communication between the game device and the central gaming system. The removable peripheral is adapted to transfer at least a portion of the gaming data therebetween to effect the play and outcome of the game of chance. Further, the removable peripheral device is selected from the group consisting of a smartcard, an E-key dongle, a memory stick, and a Secure Digital card.

In another specific embodiment, a method for executing pre-purchased gaming play for a portable gaming device is provided including selectively generating pre-viewed gaming data, on a central gaming system, representing the play and outcome of one or more pre-purchased games of chance, the last game of which is generated at a first time. Next, selectively communicating the pre-viewed gaming data from the central gaming system to the gaming device; and reconciling post-viewed gaming data from the gaming device, viewed at a time-shifted second time after the first time, with the central gaming system for authentication of the post-viewed gaming data.

In one specific embodiment, the selectively communicating event includes communicating the pre-viewed gaming data through a removable communication interface adapted for communication between the central gaming system and the gaming device. The selectively communicating event further includes storing, via a reader device, the pre-viewed gaming data onto a storage unit of the removable communication interface, and the reconciling post-viewed gaming data event includes retrieving, via the reader device, the post-viewed gaming data from the storage unit of the removable communication interface.

In yet another specific embodiment, a method for executing gaming play on a remote gaming device including selectively receiving pre-viewed gaming data on the gaming device. The pre-viewed gaming data being executed on central gaming system, and representing one or more pre-purchased games of chance, the last game of which is executed at a first time. The method further includes receiving input instructions, from one or more input mechanisms of the gaming device, to commence play of the pre-viewed gaming data. This data represents the play and outcome of the one or more pre-purchased games of chance executed by the central gaming system. Finally, the method includes displaying the play and outcome of the one or more pre-purchased games of chance on a display screen of the gaming device, at a second time after the first time, wherein the pre-viewed gaming data thereafter constituting post-viewed gaming data.

Various embodiments of the invention comprise methods for verifying the personal gaming device for use and for reconciling game outcomes. In one embodiment, biometric information such as a player's fingerprint is read at the personal gaming device and used to verify the player's entitlement to financial transactions and/or entitlement to play a game. In one embodiment, the outcomes of games played at the personal gaming device are transmitted to a game or financial server. These actual outcomes are reconciled against the outcomes as determined from the generated game results data. The reconciliation step confirms the player's loss or win associated with the play of the game or games.

Further objects, features, and advantages of the present invention over the prior art will become apparent from the detailed description of the drawings which follows, when considered with the attached figures.

DETAILED DESCRIPTION OF THE INVENTION

The invention is personal gaming device and various methods and systems for presenting a game with such a device. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the present invention comprises a personal gaming device. The personal gaming device is adapted to present a game for play by a player. In a preferred embodiment of the invention, at least one game comprises a game of chance, and more particular such a game requiring that a player place a monetary wager in order to be entitled to play the game. In one or more embodiments, as detailed below, the personal gaming device is associated with a gaming network or server.

Figure 1:
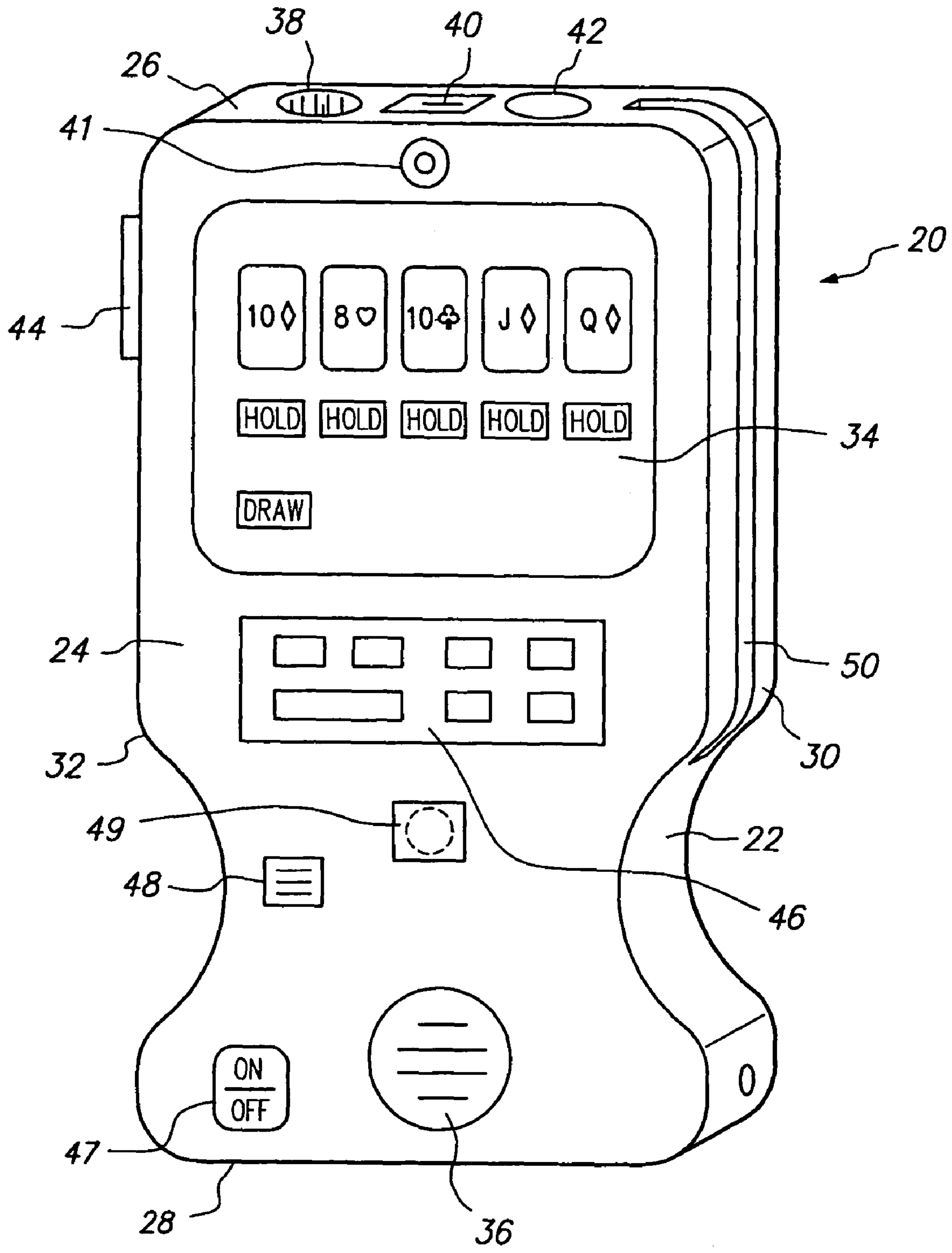
FIG. 1 is a perspective view of a personal gaming device in accordance with an embodiment of the invention.

FIG. 1 illustrates a personal gaming device 20 in accordance with one embodiment of the invention. In general, the personal gaming device 20 includes a body or housing 22. The body 22 may be constructed from a wide variety of materials and in a wide variety of shapes.

In one embodiment, the body 22 is constructed from one or more molded polypropylene or other plastic components. The body 22 may be constructed of metal or a wide variety of other materials.

As illustrated, the body 22 is generally rectangular in shape, having a front side or face 24, a rear side or face (not visible), a top end 26, a bottom end 28, a first side 30 and a second side 32. Preferably, the body 22 defines an enclosed interior space (not shown) in which a variety of components are located.

In a preferred embodiment, the personal gaming device 20 is adapted to present video and sound game data to a player. As illustrated, the personal gaming device 20 includes a display 34. The display is located in the front face 24 of the body 22, thus facing upwardly towards a player. In a preferred embodiment, the display 34 comprises a liquid crystal display (LCD), and in particular, an LCD permitting touch-screen input. It will be appreciated that other types of displays may be provided.

The personal gaming device 20 also includes a sound generating device in the form of at least one speaker 36. In one embodiment, the speaker 36 is positioned beneath a top or cover portion of the body 22 having one or more perforations or apertures therein through which the sound may readily travel. As illustrated, the speaker 36 is located near the bottom end 28 of the body 22, generally opposite the display 34. It will be appreciated that the speaker 36 or additional speakers may be provided in a wide variety of locations, such as at one or both sides 30,32 of the body 22.

In a preferred embodiment, the personal gaming device 20 is adapted to send and/or receive data from another device. As such, the personal gaming device 20 includes one or more data input and/or output devices or interfaces. In one embodiment, the personal gaming device 20 includes an RS-232 data port 38 for transmitting and accepting data, such as through a cable extending between the device 20 and another device, such as a computer. In one embodiment, the personal gaming device 20 includes a USB data port 40 for transmitting and accepting data, also through a cable. In one embodiment, the personal gaming device 20 includes an infrared data transmitter/receiver 42 for transmitting information in wireless, infrared light form. In a preferred embodiment, the personal gaming device 20 includes another wireless communication device 44, such as a wireless communication device/interface operating at radio frequency, such as in accordance with the IEEE-802.1x standards or the Bluetooth™ standard.

Preferably, a player is permitted to provide input to the personal gaming device 20, such as for playing a game. As stated above, one means of input may be through the display 34. The display 34 may also be arranged to accept input via a stylus or other device.

In one embodiment, the personal gaming device 20 includes a keypad 46. In one or more embodiments, the keypad 46 is a sealed keypad having one or more keys or buttons which may be activated by a player, such as by depressing the button with their finger.

The personal gaming device 20 includes a microphone 48. The microphone 48 is arranged to accept voice input from a player.

In one embodiment, the personal gaming device 20 includes an image collection device 41, such as a camera. The image collection device 41 may be used, for example, to capture the image of a user or player of the personal gaming device 20. This image information may be used for security or authentication purposes.

The personal gaming device 20 may also include a fingerprint scanner 49. In one embodiment, as illustrated, the fingerprint scanner 49 may be located behind or beneath a user input button, such as a "spin" or "draw" button. In this manner, a player's fingerprint may be obtained without the user or player having to consciously participate. As described below, a player's scanned fingerprint information may be used for authentication purposes. Such a scanning device may be similar to that offered by AuthenTec, Inc. of Melbourne, Fla.

The personal gaming device 20 may include a card reader 50. As illustrated, the card reader 50 is located in a side 30 of the body 22 of the device 20. In a preferred embodiment, the card reader 50 comprises a magnetic stripe reader for reading information from a magnetic strip of a card. The card reader may also be adapted to write or store data to a smart card or portable memory module. As illustrated, the card reader 50 includes a slot which is positioned in the side 30 of the device 20.

Other input devices may alternatively be provided or be provided in addition to those input devices described. For example, a player may be permitted to provide input through a joystick (not shown). The joystick may comprise a control element associated directly with the body 22 of the device 20. Alternatively, the joystick may be separate from the personal gaming device 20, and then be placed in communication therewith, such as by plugging in the joystick to a data port of the device 20. A smart card reader, optical reader or other input device may be provided for reading information from another element, such as a card, ticket or the like. The personal gaming device 20 may also include a keyboard or mouse.

The personal gaming device 20 may be battery-powered, such as with a rechargeable battery pack. An ON/OFF button 47 may be provided for controlling the power to the device 20.

Figure 2:
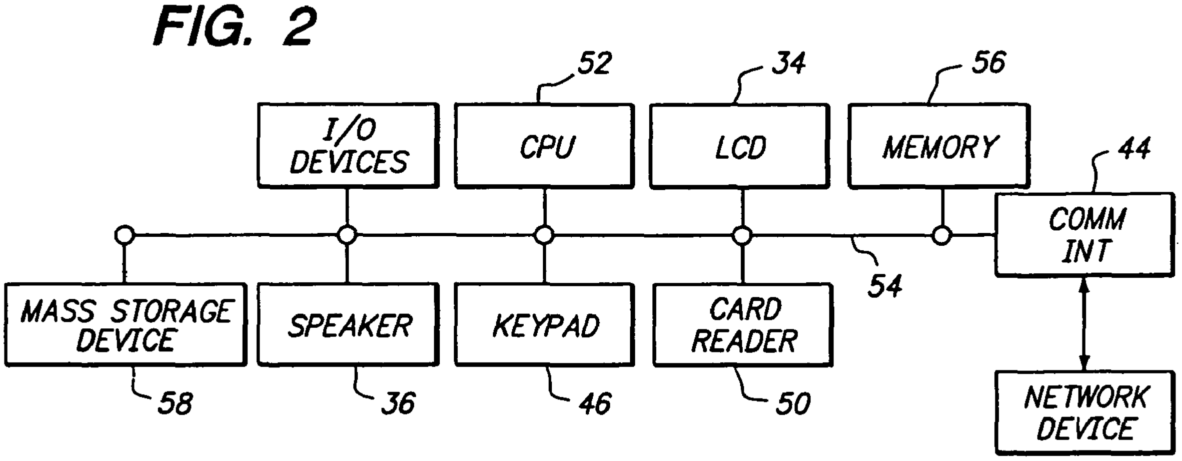
FIG. 2 is a block diagram of a component arrangement of the personal gaming device illustrated in FIG. 1.

Preferably, the personal gaming device 20 includes control means for controlling the operation of the device 20, including accepting input and providing output. One embodiment of such a control means is illustrated in FIG. 2.

As illustrated, the personal gaming device 20 preferably includes a computing environment serving as the control means. The computing environment includes a central processing unit 52. The central processing unit 52 preferably comprises a microprocessor, such as those well known and manufactured by such companies as Intel, AMD, Transmeta and Sun Microsystems, Inc.

The central processing unit 52 is associated with a bi-directional system bus 54. The system bus 54 may contain, for example, thirty-two address lines for addressing a video memory or main memory. In addition, the system bus 54 preferably includes a thirty-two or sixty-four bit data bus for transferring data between and among components associated with the bus 54. Alternatively, multiplex data/address lines may be used instead of separate data and address lines.

The display 34 is coupled to the bus 54. In one embodiment, a video memory (not shown) is provided in association with the bus 54. The video memory may be dual-ported video random access memory. The video memory is preferably coupled to and arranged to drive the LCD display 34. Of course, the video memory might be coupled to a CRT or other suitable display device.

A memory 56 is associated with the system bus 54. In one embodiment, the memory 56 comprises dynamic random access memory (DRAM), synchronous DRAM or other forms of random access memory. The memory 56 may have other forms as well, such as electronically erasable programmable read only memory (EEPROM). Preferably, the memory 56 is of the type which permits data to be written thereto and read therefrom. A mass storage device 58 is preferably also accessible via the bus 54. The mass storage device 58 may be of the read-only type (such as a CD or DVD optical drive) or may be of the read-and-write variety such as flash memory, compact flash, or CD/DVD-R/W drives.

As illustrated, the variety of input and output devices are associated with the system bus 54, and thus the other components associated with the bus. As illustrated, the speaker 36, keypad 46 and card reader 50 are associated with the system bus 54. A variety of data input/output devices ("I/O Devices") may also associated with the system bus 54, such as, though not specifically illustrated, the RS-232 port 38, the USB 40, and the infrared communication transmitter/receiver 42. As will be appreciated, these devices/elements may operate in accordance with different protocols and have different architectures, and have appropriate interfaces provided for communicating with the system bus 54. For example, the infrared transmitter/receiver may have different layers, including a physical layer including the light-emitting device, and link and other layers which include software and/or hardware, as is known. A variety of other input/output devices may be associated with the personal gaming device 20, as now known or later developed.

Preferably, as stated above, the personal gaming device 20 includes a wireless, radio frequency, communication interface operating in accordance with the IEEE 802.1x or Bluetooth™ standards. The architectures/protocols of such wireless communication interfaces are well known and thus will not be described in detail herein. In general, however, such an interface 44 permits two-way data communication. As described in detail, the personal gaming device 20 may be permitted to communicate with a wide variety of devices/systems, including at least one device associated with a gaming network.

In accordance with the invention, the personal gaming device 20 can send data and receive data, including program code, through the communication interface 44 (or the other input/output devices, such as the infrared transmitter/receiver). As one example described in more detail below, a gaming server may transmit requested code for an application via a transceiver to the communication interface 44 of the personal gaming device 20. The received code may be executed by the central processing unit 52 as it is received and/or be stored in the memory 56 for later execution.

In one embodiment, the personal gaming device 20 may include a mass data storage device (not shown) such as a hard drive, CD-ROM or the like. In one or more embodiments, the memory 56 may comprise a smart card or similar easily removable (and replaceable) device. In such event, data, such as operating code, may be associated with the personal gaming device 20 via a CD-ROM placed in a CD-ROM drive or by insertion of a coded smart card or portable memory module.

In one or more embodiments, the personal gaming device 20 is associated with a gaming system. In a preferred embodiment, the personal gaming device 20 is only operable or at least incapable of presenting certain functions or features unless associated with such a system.

Figure 3:
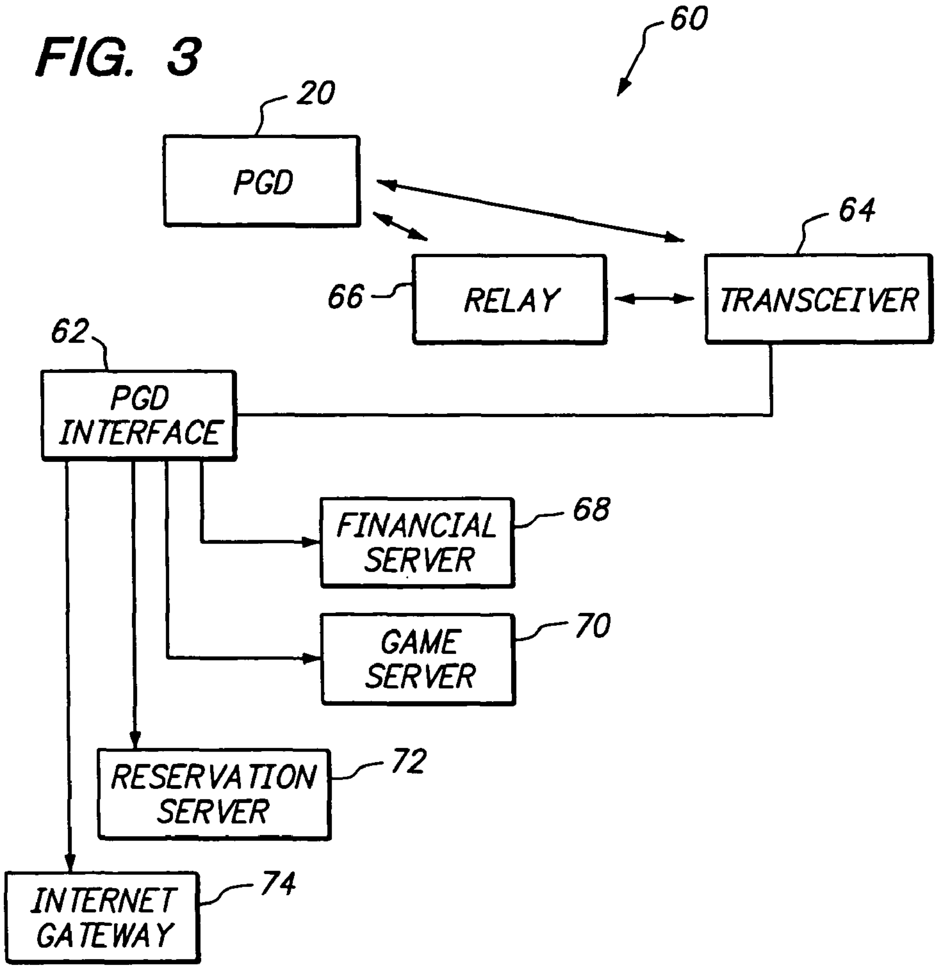
FIG. 3 is a schematic of a gaming system including a personal gaming device in accordance with the invention.

A gaming system 60 in accordance with one embodiment of the invention is illustrated in FIG. 3. As illustrated therein, the gaming server 60 includes a personal gaming device interface 62. The personal gaming device interface 62 serves as a gateway to data communications between the personal gaming device 20 and various networks, servers and other devices. In one embodiment, data communications between the personal gaming device 20 and the personal gaming device interface 62 is via a transceiver 64 associated with the personal gaming device interface 62. In general, the transceiver is arranged to receive information from the personal gaming device interface 62 and transmit it to the personal gaming device 20, or receive information from the personal gaming device 20.

As illustrated, a personal gaming device 20 may communicate directly with the transceiver 64. It will be appreciated, however, that limitations exist as to the range over which such data can be accurately transmitted. Therefore, in one or more embodiments, one or more relays 66 may be provided for receiving and re-transmitting the data to the appropriate location.

As stated above, in a preferred embodiment, the personal gaming device interface 62 serves as a gateway or interface between the one or more personal gaming devices 20 and one or more other devices, systems or networks. The interface 62, whether in the form of a wireless interface or a docking station (as described in more detail below), may be associated with or reside in a kiosk, slot or other type of gaming machine, a point of sale device, a personal computer or the like.

Figure 9:
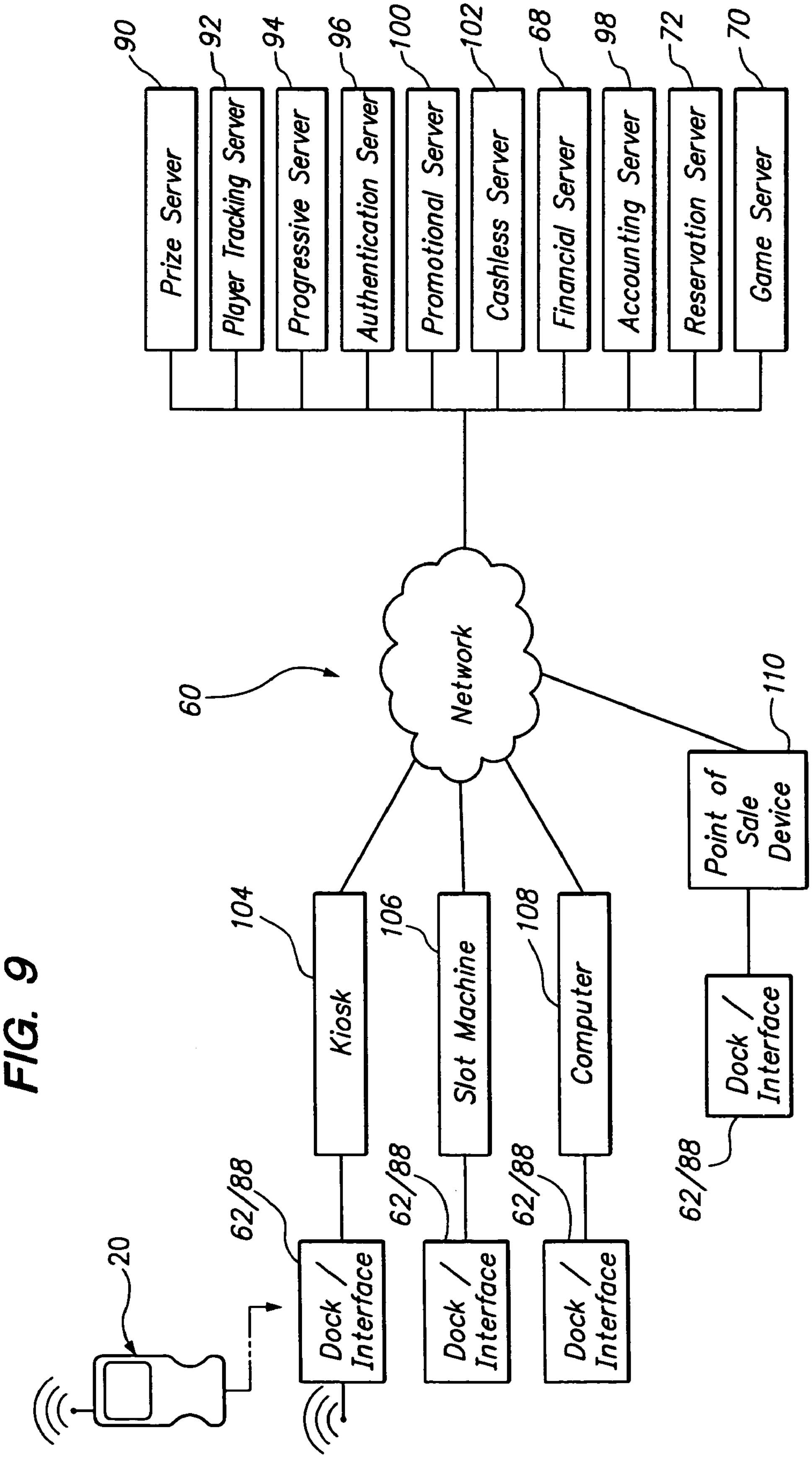
FIG. 9 illustrates yet another embodiment of a system in accordance with the invention.

As illustrated, in one embodiment, the personal gaming device interface 62 is associated with a financial server 68 either via a direct link (as illustrated in FIG. 3) or via a network (as illustrated in FIG. 9). The financial server 68 may be a computer or be associated with a computer having a processing unit and one or more data files. The financial server 68 is preferably arranged to confirm financial transaction data. For example, in order for player to be permitted to play a game using the personal gaming device 20, the player may be required to place a bet. In one embodiment, the bet may be placed using a credit card. In such event, the player may swipe their credit card using the card reader 50 associated with the personal gaming device 20. This data may be transmitted to the financial server 68 for confirmation (and as is well known in the art, generation of financial transaction data, such as a transaction date, time and value).

In one embodiment, the system 60 includes a game server 70. As illustrated, the game server 70 is associated with the personal gaming device interface 62, either directly or via a network. In one or more embodiments, the game server 70 is, or is associated with, a computing device, such as a processor adapted to execute game code. Preferably, the game server 70 is arranged to provide game data to the personal gaming device 20 via the interface 62. This game data may comprise video data for generating an image on the display 34 of the personal gaming device 20, and sound data for generating sound emitted by the speaker 36. The game server 70 is preferably also adapted to receive input from a player, such as a player selection during the play of a game.

In one embodiment, a reservation server 72 is connected to the personal gaming device interface 62, either directly or via a network. The reservation server 72 may be arranged to accept reservation selections, and provide information regarding available hotel rooms, rates, shows, restaurants and the like for use by a player of the personal gaming device 20 in making a reservation selection.

While the personal gaming device 20 may communicate with other devices via direct network links as illustrated in FIG. 2, the personal gaming device 20 may communicate with a variety of other devices via a network, as illustrated in FIG. 9. For example, the personal gaming device 20 may communicate with a prize server 90, a player tracking server 92, a progressive server 94, an authentication server 96, an accounting server 98, a promotional server 100, and a cashless transaction server 102, among others in addition to the gaming sever 70 and financial server 68, via a network.

Figure 8:
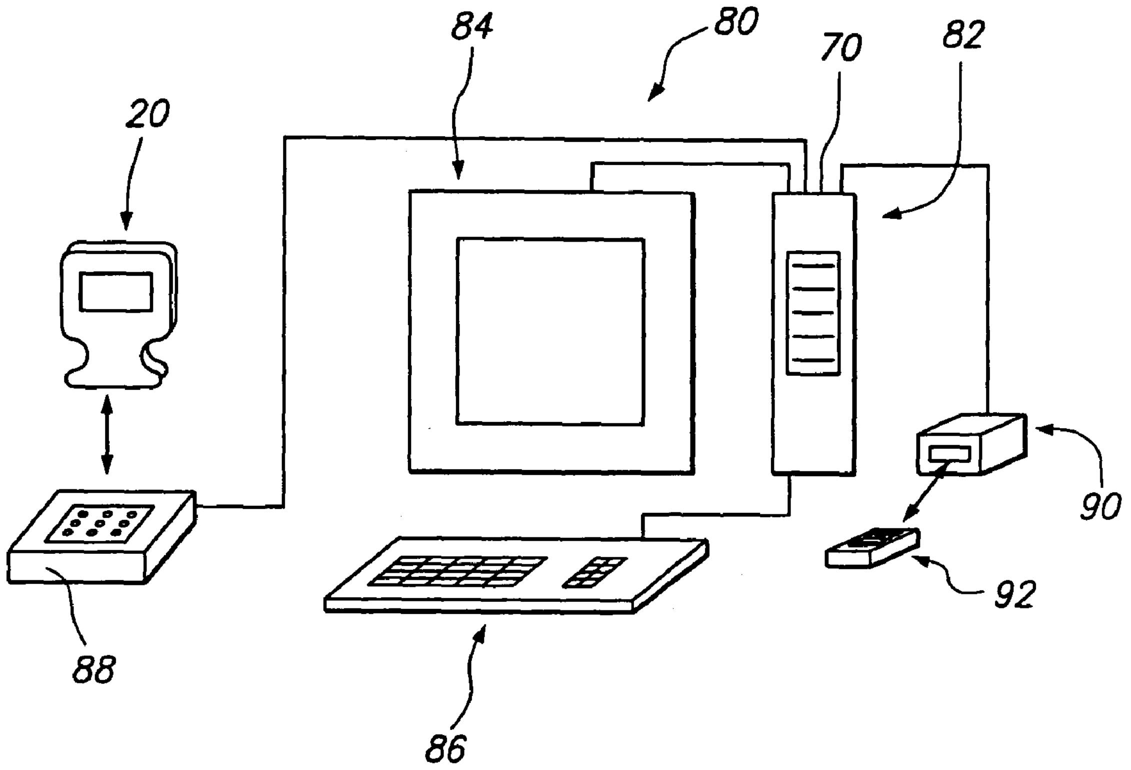
FIG. 8 illustrates a docking station of the invention.

As described below, the personal gaming device 20 may communicate with these other devices via a wireless communication link with the wireless communication interface 62 or, referring to FIG. 8, via a direct connection with a docking station 88. Referring to FIG. 9, the interface 62 and/or docking station 88 may in turn be associated with or integrated into a kiosk 104, a slot or other type of gaming machine 106, a personal computer 108, or a point of sale device 110 or the like. These devices may then be connected to or associated with a network.

In one embodiment, as illustrated in FIG. 2, the personal gaming device interface 70 is connected to an Internet gateway 74. This Internet gateway may comprise a computing device which is coupled to the Internet, such as through an Internet service provider. In one embodiment, as illustrated in FIG. 9, the Internet may comprise or be part of the network which allows the personal gaming device 20 to connect to a variety of other devices, such as the servers. In another embodiment, the network may comprise a dedicated gaming network with which these devices are associated.

The personal gaming device interface 62 may be arranged to facilitate communication between devices, systems and networks operating in accordance with differing protocols. For example, the personal gaming device interface 62 may be arranged to communicate with the personal gaming device 20 in accordance with a wireless IEEE 802.1x standard. On the other hand, the personal gaming device interface 62 may be arranged to communicate with the financial, game, reservation and other servers operating in accordance with an IEEE 1394 ("Firewire") protocol, or Ethernet or the like. In addition, the personal gaming device interface 62 may be arranged to communicate with the Internet gateway 74 in accordance with a PPP or SLIP protocol.

As will be appreciated, the data which is transmitted to and from the personal gaming device 20 is preferably provided with an address or other identifier of the intended destination of the information. This address information is used by the personal gaming device interface 62 for directing data received from a personal gaming device 20 to a particular destination, such as the game server 70. Likewise, data which is directed to a personal gaming device 20 preferably has an address associated therewith for identifying the particular intended destination. It will be appreciated that more than one personal gaming device 20 may be associated with the interface 62, such that a unique address or identifier is necessary to properly associate data with its intended destination.

In one or more embodiments, the personal gaming device 20 may be programmed with a specific address or other security information, such as a password to prevent association of unauthorized devices with the system 60. In one embodiment, each personal gaming device 20 may implement a data encryption/decryption scheme such as RSA or DSA. Some or all of the information or data which is transmitted to or from the personal gaming device 20 may be encrypted to prevent its interception and use by unauthorized users. The encryption/decryption key(s) may be associated with the personal gaming device 20 with a module or similar removable device. A user may be required to obtain a module in order for the device 20 to function.

One method of using a personal gaming device such as the personal gaming device 20 illustrated in FIG. 1 will now be described.

First, a player obtains a personal gaming device 20. In one arrangement, a casino may allow a player to check out a personal gaming device 20. For example, a casino may have a central desk or station at which a player may obtain a personal gaming device 20. In one embodiment, a player may be required to leave a deposit to check the device out, helping ensure that the player will return the device when they are done using it.

In one embodiment, a player may also be permitted to purchase a personal gaming device 20. Having obtained a device, the player may be able to use the device at a variety of locations, including at a kiosk, slot machine, casino area, personal computer or the like (see FIG. 9). In another embodiment, a player may be required to rent the device, such as by paying a fee for the time which the player uses it.

Once the player has obtained a personal gaming device 20, the user may be permitted to engage in one or more activities. In one embodiment, some activities may be presented by the personal gaming device 20 itself. For example, software code may be stored in the memory 56 for execution by the processing unit 52 for permitting certain functions, such as the playing of music, display of "how to use" or "help" information and the like.

Preferably, however, the number of functions which are fully supported by the personal gaming device 20 are limited. This limits the total amount of memory which the personal gaming device 20 needs to include. Thus, one or more functions or activities are supported only by associating the personal gaming device 20 with a gaming system such as that illustrated in FIG. 3.

In one embodiment, when the personal gaming device 20 is turned on, such as with the ON/OFF button 47, the personal gaming device 20 is adapted to send a signal to the personal gaming device interface 62 or other device for establishing a communication link. Once this communication link is provided, data may be transmitted to and from the personal gaming device 20 and the other networks/systems/devices.

Once a communication link is established, master menu information may be transmitted from the personal gaming device interface 62. For example, casino personnel may generate menu information and load it into a memory associated with the personal gaming device interface 62. Upon a personal gaming device 20 establishing a communication link with the personal gaming device interface 62, the menu information may be transmitted to the personal gaming device 20 for display thereon.

A player may then select one or more activities or functions from the displayed menu. Input may be provided by touching an area of the screen 34 associated with a menu item, providing keypad entry, or in other manners. In one embodiment, a player may be permitted to engage in activities or obtain services at no charge. For example, a player may be permitted to access the Internet using the personal gaming device 20 at no charge to the player. The player may also be permitted to obtain show, ticket, hotel, restaurant and other information and place reservations and the like at no charge.

In one or more embodiments, a player is required to pay to engage in one or more activities. In a preferred embodiment, a player is required to place a bet or ante in order to play one or more games. Of course, one or more games may be provided for free. Alternatively, a player may be required to place a bet or ante if the player is to be entitled to an award or winning if the outcome of the game is a winning outcome. In another embodiment, the casino or other party may give away prizes. For example, a player may be permitted to play in one or more complimentary games, with the player being awarded a prize (money, a hotel night stay, free dinner or the like) in the event the player is a winner of the game.

In the event the player is required to place a bet or desires to place a bet, the player may do so in a variety of manners. In one embodiment, the player may provide credit or value using a credit card. As described above, the player may swipe their credit card with the card reader 50. Data read from the player's card may be transmitted from the personal gaming device 20 to a financial server for verification. In another embodiment, a player may place a deposit with the gaming operator and be provided with a player card. For example, when the player checks out the personal gaming device 20, the player may place a monetary deposit or credit deposit. The deposit may be associated with a player's account and/or a player card. The deposit data may be stored in a master database, with a particular file being assigned an identifier. That identifier may be stored on the player card. Later, the player may swipe their player card. The read identifier may be transmitted and the deposit data obtained from the corresponding file.

A variety of other methods may be provided for the player providing the credit or value. For example, a player may be provided with an encoded ticket (bar code or the like), or a smart card or other element having data which provides verification of the player's credit or payment.

In one embodiment, the player may select the amount of the bet or ante by providing input to the personal gaming device 20. For example, once a player has selected a game for play, a gaming server may transmit bet screen data. The bet screen may indicate to a player that the player may bet anywhere from 1 to 5 credits, each credit having a value (such as $0.25 US, $1.00 US or the like). The player may select the desired bet. Upon receiving the data, the game server may instruct the player to provide the necessary credit, such as by swiping the credit card.

In one embodiment, a player may create a bank of credits from which the player may place bets. For example, a player may be permitted to place a large deposit with the operator or may use their credit card to create a large deposit. This deposit may be associated with an account of the player. The total credit of the player may be displayed by the personal gaming device 20. Such an arrangement may be similar to that of current game machines were a player may provide a $20 bill to generate 20 $1 credits, with the number of credits indicated to the player.

Once verification has been provided of the player's bet or ante, the player may be permitted to play the game. In a preferred embodiment, the game data is generated by the game server 70 and transmitted to the personal gaming device 20. FIG. 1 illustrates an embodiment of a personal gaming device 20 which is displaying a screen of a game of video poker, the screen displaying cards and instructions to the player. The player may provide input to the game server 70 as necessary.

In one embodiment, a player may be permitted to raise their bet or ante, or otherwise place other bets, during the course of the game. In such event, the player may provide credit as described above.

Depending on the outcome of the game, an award or winning may be provided to the player. In one embodiment, a winning is associated with an account of the player or may be credited to the credit card account of the player. In another embodiment, the device 20 may include a ticket printer or other device for issuing an element having the value associated therewith (or at least data regarding the value the player won). At the end of a game or group of games, the result(s) are uploaded to the accounting server (if a communication link is present), or stored in a secure memory for later upload and reconciliation (if a communication link between the personal gaming device and the accounting server is not present).

A player may play any number of games, switch to other activities, or return the personal gaming device 20 at any time.

In one or more embodiments, means may be provided for ensuring that the personal gaming devices 20 are returned and not stolen. First, in one embodiment, the personal gaming devices 20 may be restricted to use in a particular area. For example, use of the devices may be permitted only in a particular game room. By monitoring the exits, the theft or loss of the personal gaming devices 20 may be controlled.

In another embodiment, a "fence" may be created which, if the personal gaming device 20 is crossed over, results in one or more security measures being activated. The fence may comprise one or more emitters which emit a signal detectable in a restricted area by the personal gaming device 20. Upon detecting the signal, the personal gaming device 20 may be arranged to generate a loud audible signal (such as by speaker 36) warning that the personal gaming device 20 is being removed from the authorized area. The personal gaming device 20 may also be arranged to display a warning message to a player. In one embodiment, the memory of the personal gaming device 20 may be erased, preventing the player's further use of the device (without returning it back to the gaming operator for resetting the device) and protecting the gaming operator by preventing the player from obtaining any critical information which would otherwise be associated with the device. In another embodiment, operation of the personal gaming device 20 is simply disabled when a network or communication connection is not present. In this manner, the personal gaming device 20 is operable only within a limited, defined perimeter.

In this regard, one advantage of the personal gaming device 20 is that it may be configured so that gaming code is not stored or resident at the personal gaming device 20 except during use. In particular, the gaming code which is utilized to present and play the game is stored remotely, such as at the game server 70. The game data may be transferred to the personal gaming device 20 only upon authorization for presenting a game. Therefore, even theft of the device would not result in the thief obtaining proprietary, important game code.

In one or more embodiments of the invention, the personal gaming device 20 may be "customized" for a particular player. In one embodiment, a player may create a player account. This account may not only include credit information, but may include player preference information. For example, a player may designate that they prefer to play a particular game and place bets in a particular denomination. These preferences may be indicated by a player on a sign-up sheet which is then used to create the account, or by input to a program interface which player's may use to generate their accounts.

The personal gaming device 20 may be customized in other manners. For example, the personal gaming device 20 may be configured to display information via a graphical user interface. The color(s) of elements of the interface may be personalized. In addition, menus, "button" layout and the like may also be customized.

In one embodiment, the player preferences may also be stored on a player card or other portable input device. For example, at the time a player creates a player account, they may input their preferences. These preferences may be stored on a portable card. The player may use the personal gaming device 20 to read the personal information and configure itself accordingly.

In one embodiment, the player is issued a player card which includes information regarding the player's account. When the player swipes their player card using the card reader 50 of the personal gaming device 20, information may be provided regarding the player's account, such as the account number. The player's account may then be accessed and the information therein be used to personalize the gaming device 20. For example, the player's account information may be used by the personal gaming device interface 62 to generate a personalized menu for display, or to automatically present the player's favorite game as customized with the player's default bet.

Additional embodiments of the invention will be described with reference to FIGS. 4-7. These figures illustrate an embodiment of a method of presenting a game using a gaming device, such as the personal gaming device 20 described above. Various other features of the invention are illustrated therein and will be described below in conjunction with this method, it being understood that the features may be implemented alone or other combinations and method of use.

Figure 4:
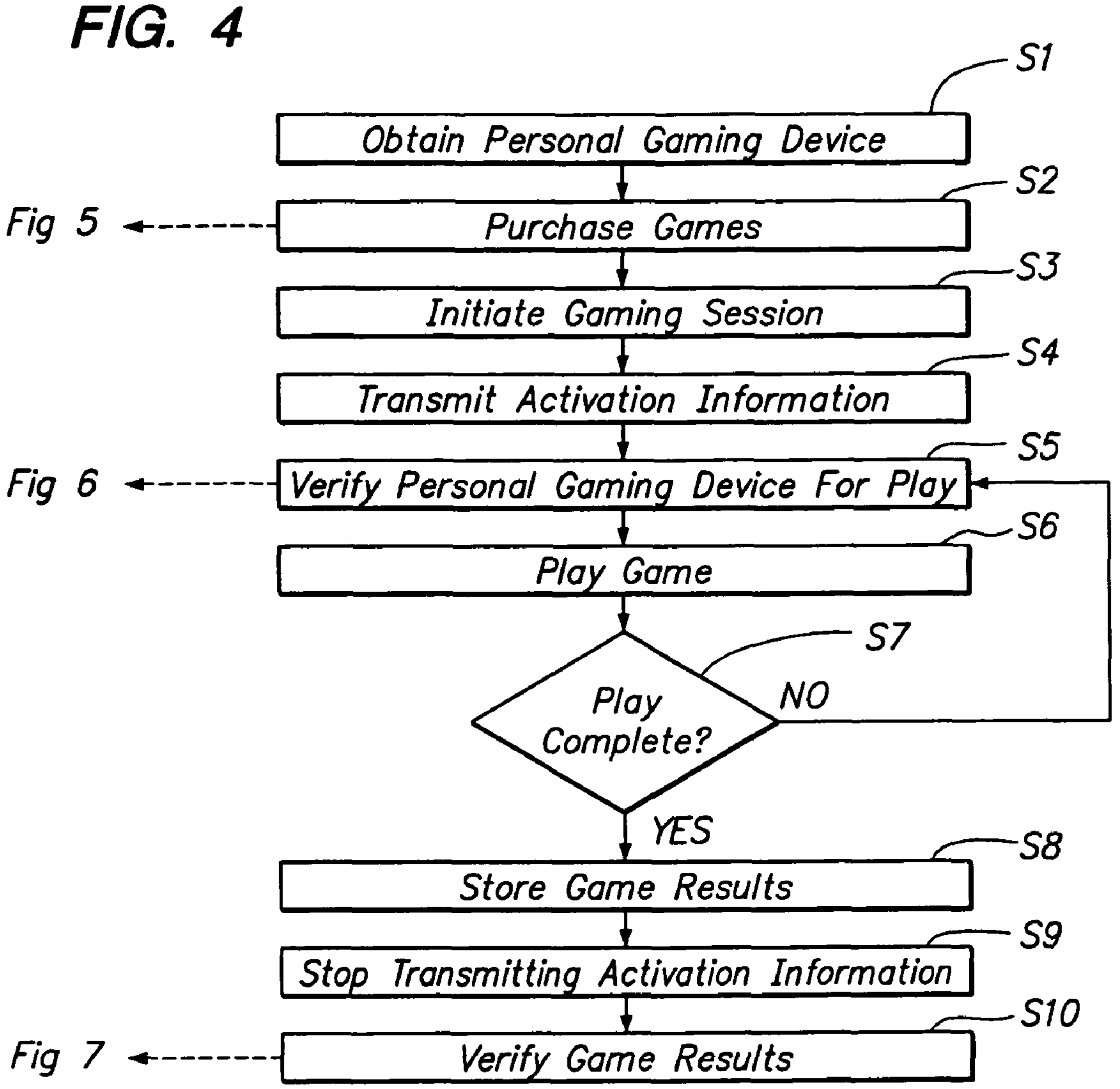
FIG. 4 is a flowchart illustrating a method of presenting a game with a personal gaming device in accordance with one embodiment of the invention.

FIG. 4 illustrates one method of presenting a game in accordance with the invention. As indicated, the method may be implemented via a system 60 such as that described above, the system including one or more personal gaming devices 20.

As illustrated, a method of the invention starts with a step SI in which a player obtains a gaming device. The gaming device may be of a variety of types, such as a personal gaming device 20 as described above, a personal data assistant (PDA), laptop or other device. The device may or may not be portable, and may be located remote from other devices of the system.

In a step S2, a player purchases or otherwise obtains the right to play one or more games. One such method will be described in detail with reference to FIG. 5.

Figure 5:
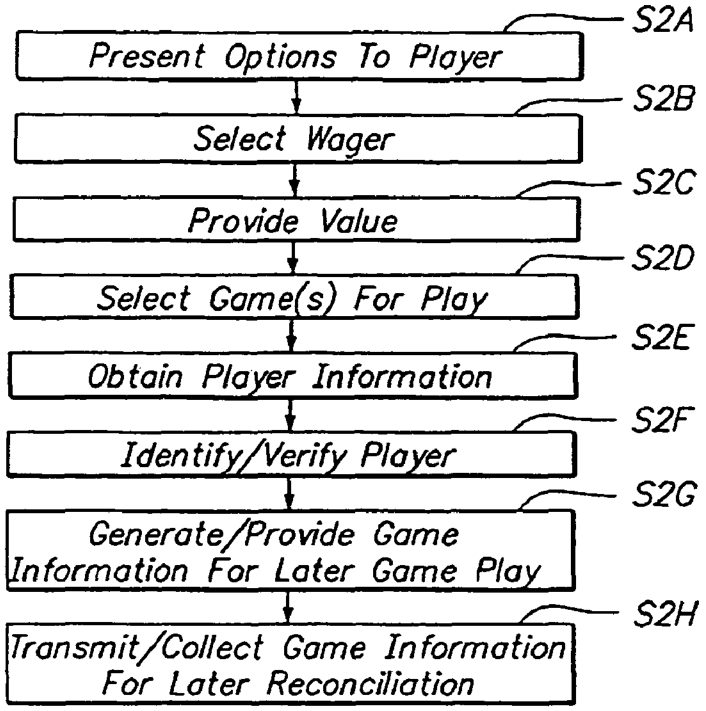
FIG. 5 is a flowchart illustrating one method of purchasing games for play on a personal gaming device.

As illustrated in FIG. 5, in a step S2A, the player is preferably presented with at least the option to purchase one or more game play events. As illustrated, the player may also be presented with a variety of other options, such as options relating to a player account. As described above, a player may have an account which the player uses to provide value, such as for purchasing games or placing wagers. The account may be associated with a bank or other financial entity, or may be associated with the casino or game presenter.

In the embodiment illustrated, the player is presented the option to (a) reconcile an account; (b) purchase games; (c) review or make an inquiry regarding an account; (d) withdraw cash or (e) deposit cash. Options (a) and (c)-(e) will not be described in detail herein, as they may be implemented in a variety of fashions. These options may, however, be associated with various methods permitting a user to access an account, make deposits, make withdrawals, obtain account information and the like.

If the player selects option (b), then in a Step S2B, the player is permitted to purchase one or more games or game events. This function may be accomplished in a variety of manners. In one embodiment, this selection causes the personal gaming device 20 to connect to the game server 70. Preferably, the player then selects or inputs the amount to be wagered. For example, the player may elect to play $100.00 worth of games.

In a step S2C, the player provides value representing the amount the player has elected to wager. As described above, a player may use a credit card to provide this payment. If the personal gaming device 20 is so configured, such as by including a bill validator or coin acceptor, the player may also use currency. In one embodiment, the player may utilize a player financial account established with a casino or other game provider. The provided value may comprise other than monetary value, such as player points or other indicia which the game provider will accept.

In a step S2D, the player selects one or more games to play. In one embodiment, the player may be presented with a menu of games to select from. A player may select a single game or multiple games for play.

In one embodiment, the player may be provided with information regarding the number of games to be played in relation to the amount bet. For example, a player may elect to wager $100.00 playing games of video poker. The player may then be requested to indicate how much they wish to wager on each particular game. For example, the player may be required to indicate whether they wish to wager $0.025 or $1.00 per game, or a default bet may apply to one or more of the games. If the player selects or the default bet is $1.00 per game and the player has wagered $100.00, then the game server may indicate to the player that they are entitled to play 100 games of video poker.

It will be appreciated that the general purpose of the above-described steps is to define the number of games that the player wishes to play and has provided a wager or payment to play. As described, the number of games may vary dependent upon a number of factors, including the total amount the player wishes to wager and the amount of the wager per game or cost to play each game. Thus, the steps may vary depending on various factors. For example, game play packages may be offered for player selection. A game play package might comprise the option to play 25 video poker games at $1.00 per game for a certain wager, such as $25.00, or even at a discount. In this example, the player may only need to select one of the game play packages and provide the appropriate wager.

Next, the identity of the player and/or the right of the player to play the game may be verified. In one embodiment, in a step S2E, certain information regarding the player is obtained. As illustrated, this information comprises biometric information, such as a player's fingerprint. In a step S2F, the collected information is used to identify the player and/or verify their entitlement to play the games. In one embodiment, this comprises comparing the collected biometric information with stored biometric information. For example, when a player sets up their financial account with the casino, or in order to check out a personal gaming device 20, the player may be required to provide biometric information. This information is stored for use in the verification process.

It will be appreciated that other information may be used to identify the player and/or verify entitlement to play a game. For example, verification may be accomplished through use of identifiers such as passwords or the like. Other biometrics may be used, such as a retina scan, facial features (such as via capture of the player's image with the camera 41), or via other authentication.

In one embodiment, the verification step includes verifying that the player is of legal age to play the game. In one embodiment, only players whose age has been verified are allowed to set up an account or obtain a personal gaming device 20. In this configuration, verification is assured once a player's biometric information matches, since the player could not access the account or device without being legal age in the first instance. This prevents, for example, adolescents from using the personal gaming device 20 to play a game, as well as preventing third parties other than the player from using the personal gaming device 20.

In a step S2G, the game server 70 provides game information. In one embodiment, as described above, this may comprise the download of game code to the personal gaming device 20. The game code may comprise actual executable code which enables the personal gaming device 20 to present the game or games the player selected.

In a preferred embodiment of the invention, base game code is stored or resides at the personal gaming device 20. This game code does not by itself, however, permit the personal gaming device 20 to present a game. In this configuration, additional code or data must be supplied to the personal gaming device 20 in order for the personal gaming device 20 to present the game.

In one embodiment, the gaming server 70 is configured to transmit game result and/or paytable information. The game result information preferably comprises randomly generated game outcome data which, when provided to the personal gaming device 20, causes the personal gaming device 20 to present a game having the particular outcome associated with the outcome data. For example, the game outcome data may comprise random number generated results, such as a numerical code which, when provided to the gaming code, causes the gaming code to present a game having that corresponding outcome. In the case of a "slot" type game, the outcome code may represent the winning outcome "three cherries." In other embodiments, the outcome code may comprise more detailed data for use presenting the game using the game code. For example, the data may represent certain cards to be dealt to the player in the game of Blackjack, as well as the possible additional cards which may be selected by the player based upon the cards they wish to discard.

It will be appreciated that the data provided to the personal gaming device 20 by the game server 70 may depend upon the number of games to be played. For example, in the example provided above in which a player has elected to wager $100.00 on $1.00 per bet games, the gaming server must provide information regarding 100 games.

As indicated, the data may also comprise paytable data. This data is useful is calculating the outcome and/or payoff of a winning outcome. It will be appreciated that the paytable is generally independent of the outcome of the game, but may vary depending upon the amount wagered. Thus, the paytable is necessary to compute the amount won when players may select differing wager amounts.

In one embodiment, additional data is provided to the personal gaming device 20. This data may include biometric data regarding the player and global positioning system (GPS) data. Once the data or information has been provided to the personal gaming device 20, in step S2H, the gaming server 70 preferably sends information to the financial server 68 for later reconciliation. This information may comprise, for example, data regarding the win or loss associated with each game for which data was provided to the personal gaming device 20. In this manner, as the player plays the games, the win and loss associated with each game can be tracked and verified.

Referring again to FIG. 4, in a step S3, the player initiates a gaming session. The player obtains a personal gaming device 20 or other gaming device such as described above. The player may be required to obtain the device from a particular source, may simply turn on the device or the like in order to initiate the session.

In a preferred embodiment, in a step S4, communication is initiated between the game server 70 and the personal gaming device 20. In one embodiment, information is transmitted from the game server 70 to the personal gaming device 20 which, when received by the personal gaming device 20, maintains the personal gaming device 20 in mode in which it will present a game. As such, the information may be referred to as "activation information." The information may comprise data which is intermittently transmitted to the personal gaming device 20. The interval between information transmissions may vary, but may be 5-30 seconds.

Preferably, the activation is transmitted via a wireless communication link. Preferably, the transceiver 64 and various relays 66 are configured, including in their number, location and power, to create a "game zone" within which the personal gaming device 20 will receive the activation information. Preferably, outside of this zone, the activation information is not received by the personal gaming device 20.

In a preferred embodiment, when the personal gaming device 20 does not receive activation information for a certain period of time, the personal gaming device 20 is configured to automatically prevent further game play. In this manner, a user of the personal gaming device 20 is not permitted to engage in game play other than in certain designated areas, such as a proscribed gaming zone or in a casino.

In one embodiment, certain features of the personal gaming device 20 may remain activated independent of the activation information. For example, various other menu features such as those permitting the player to preview games and the like may still remain active. When the player is playing games via other than a personal gaming device 20, such as a PDA or the like, various features thereof may remain activated, such as those which are independent of game play.

Figure 6:
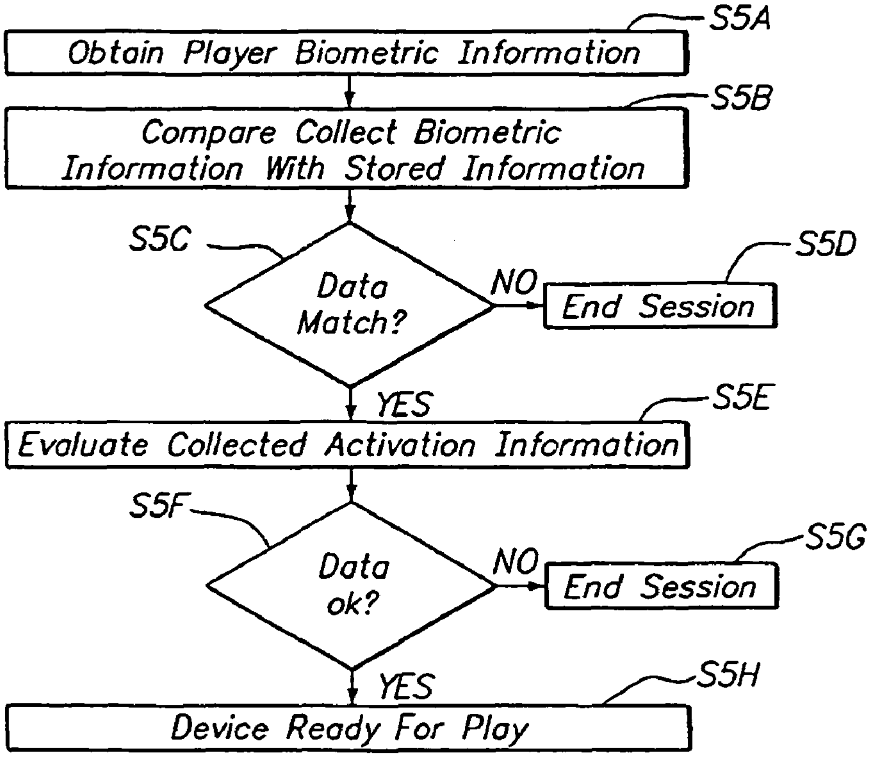
FIG. 6 is a flowchart illustrating one method of verifying a personal gaming device for game play in accordance with the invention.

In one embodiment, in a step S5, the personal gaming device 20 is verified for game play. FIG. 6 illustrates one example of such a method, it being understood that other methods may be used.

Referring to FIG. 6, in a step S5A, biometric information is obtained from the player. In one embodiment, this may comprise reading fingerprint information using a fingerprint reader 49 at the personal gaming device 20. In addition, in one embodiment, GPS data is obtained by the personal gaming device 20 regarding the location of the personal gaming device 20.

In a step S5B, the biometric information is preferably compared to the previously obtained biometric information (see step S1G, FIG. 5). If in a step S5C, the biometric information does not match, then the session is ended in a step S5D. In other embodiments, if the biometric information does not match, the player may be requested to, one or more additional times, try to match the biometric information, such as by rescanning their fingerprint.

If the biometric information matches, then in a step S5E, the activation information from the game server 70 is evaluated. This may comprise evaluating the quality or time of receipt of the information and determining if certain standards or requirements are met. If the activation information does not meet the requirements, then in a step S5G, the session is terminated.

If the activation information does meet the requirements, then in a step S5H, the personal gaming device 20 is verified for game play. Referring to FIG. 4 again, in a step S6, the player is then permitted to engage in game play. In one embodiment, one of the games selected by the player for play is presented to the player.

Preferably, at a step S7, it is determined if additional games remain to be played and if the player wishes to continue playing. If so, then the personal gaming device 20 is preferably re-verified in step S5 before the next game is presented for play.

As described above, in a preferred embodiment, when a game is presented for play, the personal gaming device 20 uses resident game code along with downloaded game data in order to present the game. The game data may comprise data representing certain "outcomes" for the games to be played.

If the player wishes to stop playing or all games have been played, then in a step S8, the results of the game or games played are preferably stored at the personal gaming device 20. These game results are transmitted to the game server 70 for verification.

In a step S9, once game play has ceased, the game server 70 stops transmitting activation information, thus preventing any further use by the player of the personal gaming device 20 in playing games.

Figure 7:
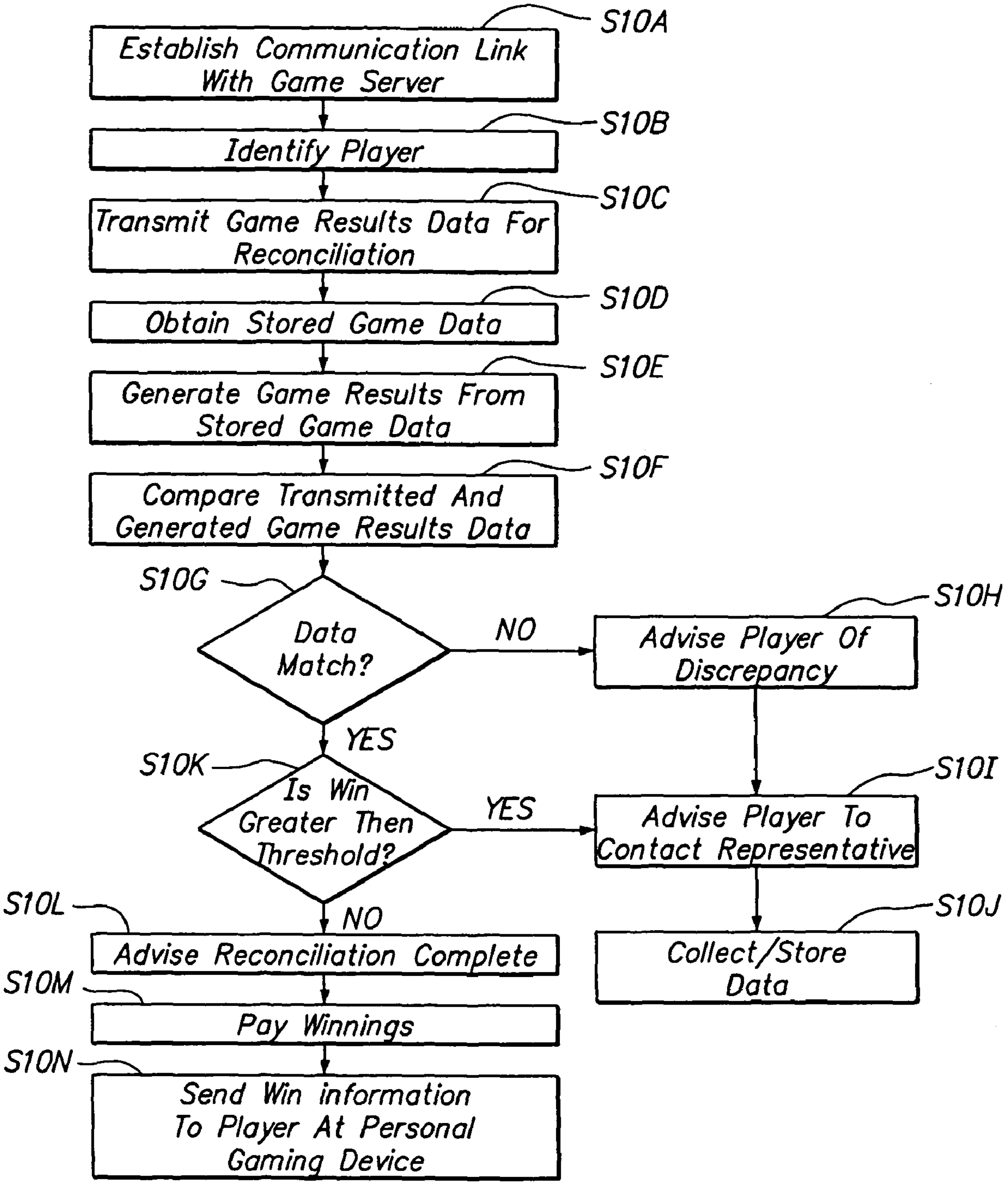
FIG. 7 is a flowchart illustrating a method of verifying game outcomes in accordance with an embodiment of the invention.

In a step S10, the game results are preferably verified. FIG. 7 illustrates one embodiment of such a method.

In a step S10A, the personal gaming device 20 establishes a communication link with the game server 70. In a step S10B, authentication occurs. Preferably, this authentication comprises either a player providing a PIN or other identifier, such as a biometric (like a fingerprint as described above).

If authentication is completed, then in a step S10C, the game server 70 preferably establishes a communication link with the financial server 68. The game server 70 transmits the game results data provided by the personal gaming device 20. This information may vary, but may comprise information identifying the particular personal gaming device 20 or "game set," as well as the results of those games, such as a monetary balance representing win and loss information for each game and/or total win or loss information.

In a step S10D, the financial server 68 retrieves the previously provided session data provided by the game server 70 when the game information was originally generated (see step S1H in FIG. 5).

In a step S10E, in one embodiment, the financial server 68 generates the results associated with the game data. This may comprise the financial server 68 determining the monetary win or loss associated with each game outcome, as well as the total win or loss for all games.

In a step S10F, the financial server compares the outcome data provided by the personal gaming device 20 to the outcome data which is based upon the game server 70 generated game data.

In a step S10G, if the data is not the same, then in a step S10H the player is preferably advised of the discrepancy in the reconciliation. The player is then advised in a step S10I to seek assistance, such as by contacting a casino representative for further investigation of the issue. In a step S10J, the financial server 68 preferably stores the data used to perform the reconciliation for use by the representative in investigating the issue.

If the data reconciles instep S10G, then in a step S10K it is preferably determined if the win for a particular game, or the total winnings for a group of games, exceeds a predetermined threshold. If so, the game results are preferably verified a second time. This step may also include additional audit procedures, such as confirming game wins. If this additional reconciliation is not successful, the player may be advised to contact a representative, as in step S10I.

If in step S10K the win amount is under the threshold, then in step S10L the player is advised that reconciliation has occurred. In a step 10M, the player is preferably paid any winnings. Where the player has a game financial account, this may comprise the financial server 68 simply updating the player's account information. The player may also be paid winnings in other manners, such as by a ticket, by credit to their credit card account or the like.

In a step S10N, the financial server 68 preferably sends the win information to the personal gaming device 20 for viewing by a player. For example, the personal gaming device 20 may be caused to display a message such as "Congratulations, you won 1015 credits. Your account has been credited and you now have 1873 total credits."

Additional aspects of the invention will be described with reference to FIG. 8. As described above, in one embodiment, a player essentially purchases the right to play one or more games, and data or information which defines or comprises the outcome of the games is generated for use in later game play. FIG. 8 illustrates a system by which the user may purchase the games for play. As illustrated, the system 60 may include one or more stations 80. The station 80 may comprise a dedicated station, such as kiosk, or may comprise a home computer. As illustrated, the station 80 has the form of a desk-top computer having a processor 82, a monitor 84 and a keyboard 86. The station 80 may have a variety of other forms. The station 80 is preferably linked at one or more times with the game server 70, such as via the Internet or a dedication communication link.

In one embodiment, the user may utilize the station 80 to purchase games for play. In one embodiment, the station 80 is configured to display menu or other information to the user in purchasing games or engaging in other activities, such as managing their account.

In one embodiment, when the player has successfully purchased games for play, the game server 70 may be configured to transmit game result information to the kiosk 70. The game result information may then be directed to a smart card interface 90, where the data may be written to a smart card 92 of the player. Once the data is stored on the card 92, the player may remove it and then input it into a gaming device, such as a personal gaming device 20 as described above. Once input into a gaming device, the information may be read from the card 92 for use in presenting one or more games.

In another embodiment, the station 80 may include a docking station 88. The personal gaming device 20 may be configured to interface with the docking station 88, permitting information to be transmitted between the station 88 and the personal gaming device 20. In one embodiment, the game result information may be provided to the personal gaming device 80 via the docking station 88. In this embodiment, the user may obtain the personal gaming device 80 and then associate it with a docking station 88, or the personal gaming device 80 may already be associated with the docking station 88 and essentially "checked-out" from that location.

It will be appreciated that in these embodiments, the exact sequence of steps for implementing a game may differ from those recited in FIGS. 4-7.

In accordance with the invention, a player may be permitted to access a wide variety of goods or services using the personal gaming device 20 other than those particularly described above. For example, a player may be permitted to access a room charges account to view the current room charges associated with their stay at a hotel. A player may be permitted to request their car from a valet service, such as by entering a valet stub identification number. A player may be permitted to obtain a wide variety of other goods, services or information, or engage in a wide variety of other activities.

The personal gaming device 20 of the present invention has numerous advantages. First, a player is permitted to use a personal gaming device 20 to participate in a game at other than a fixed location. The player may play a game at a location which is removed from the location of traditional fixed gaming devices. These locations may include the player's hotel room, a restaurant, a bar or lounge, a sports book, a hotel/casino pool area, and a wide variety of other areas remote from the fixed gaming devices. Of course, the player may also utilize the personal gaming device to participate in a game in the area of stationary gaming machines, and may even participate in games played on both the personal gaming device and a stationary machine at the same time.

Another advantage of the personal gaming device is that the device is easily transportable. The player may take the device with them as they travel from location to location, such as from a restaurant to the player's room. Thus, while the player is engaging in other activities, such as eating or moving from one location to another in a casino, the player's ability to play a game is not interrupted.

Another advantage of the personal gaming device is that its configuration results in ease of use. The personal gaming device is preferably hand-held, and wireless and can thus easily be transported by a player. In addition, the personal gaming device 20 is simplistic in design to make its use easily understandable by even inexperienced players. In general, necessary acts by a player may be prompted, such as with instructions displayed on the display or provided audibly through the speaker 36.

The personal gaming device 20 is also versatile, and is not limited to presenting only a game for play by a player. As noted, a player or user of the personal gaming device 20 may utilize the personal gaming device to access a wide variety of information and obtain a wide variety of services. The player may access the Internet, obtaining information therefrom (such as news and weather) and may obtain goods and services there through (such as by placing orders with vendors having websites). The player may make room, show or restaurant reservations and obtain hotel/casino information.

One aspect of the invention is a method of presenting games via one or more portable devices in which the devices have resident game code for presenting a game, but which without additional game data will not allow the game to be played. Preferably, the additional game data comprise game result data, such as RNG and/or paytable information. This configuration has the advantage that substantially all of the game code can be stored on the portable device, thus reducing the download times associated with configuration the device for game play. At the same time, however, the portable device will not present games without first receiving the additional data.

A related advantage of the game is the ability of the player to pay for a block of games at a single time. Instead of being force to confirm payment for each game to be played when it is played, such as by credit card authorization, the player pays for the "game results" for a block of games all at the same time.

As one aspect of the invention, the game results may be provided on a game card, such as a smart card. The player may then keep the game results and use them to play games on portable devices at various times and in various locations. For example, the player may purchase 100 games and the associated "results" may be stored on a player card. The result information may be read by a portable device for use in presenting games to a player. The player may then elect to play additional of the games at a later time, even using a different device. At that later time, the result information may again be read and used to present additional games.

Another advantage of the invention is a configuration which ensures the portable device is being used in the proper location, and is not being stolen or tampered with. As described this comprises a system in which activation information is transmitted to the portable device, and where if the information is not received or confirmed, the portable device will not present games for play. This prevents, for example, a use from taking the portable device or attempting to use it in unauthorized locations.

Figure 10:
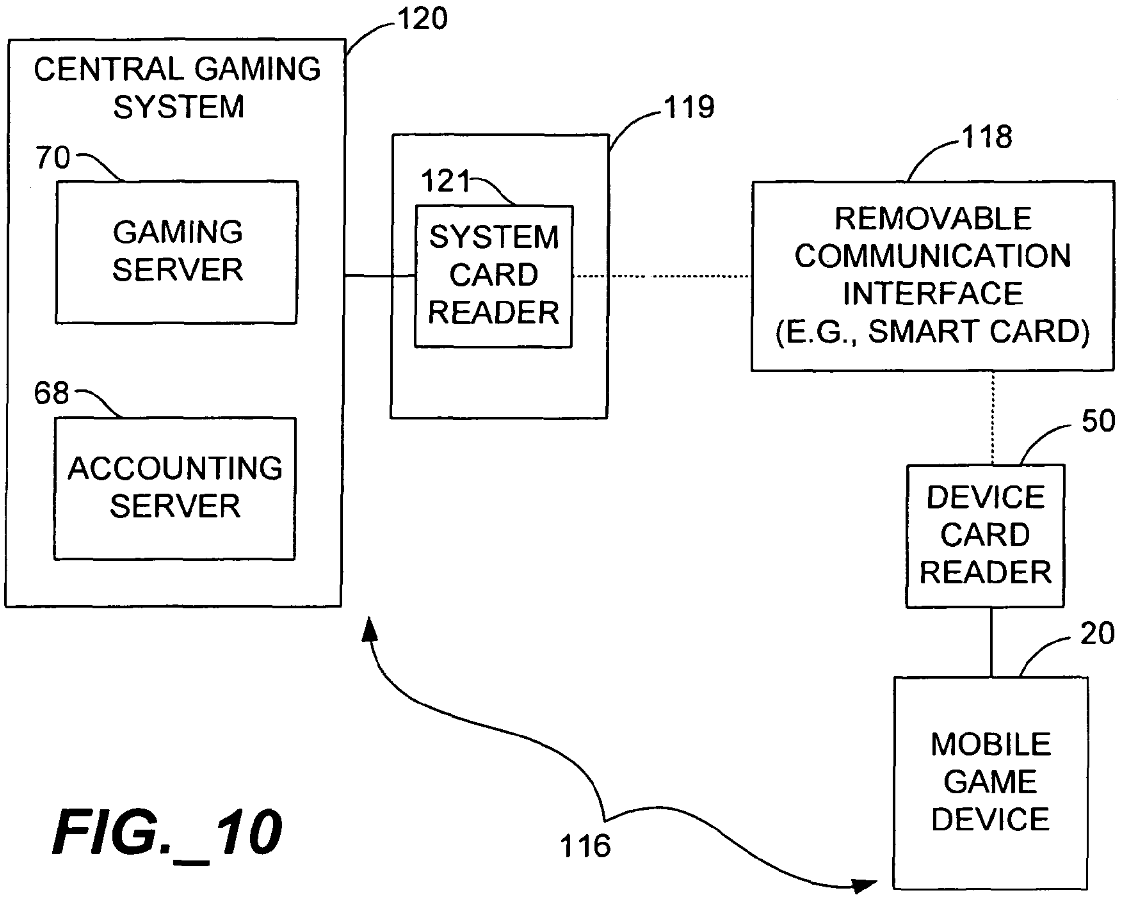
FIG. 10 is schematic of a gaming system including a remote gaming device and a removable communication interface constructed in accordance with another aspect of the present invention.
Figure 11:
FIG. 11 is an enlarged top plan view of the removable communication interface of the gaming system of FIG. 10, in the form of a smartcard.

In another aspect of the present invention as shown in FIGS. 10 and 11, a mobile gaming system, generally designated 116, is provided for selective display of one or more pre-purchased games of chance. The mobile gaming system 116 includes a remote gaming device 20 (such as that represented in FIG. 1) and a communication interface 118 (FIG. 11) adapted to communicate between a central gaming system 120 and the gaming device to selectively receive pre-viewed gaming data representing the play and outcome of the one or more pre-purchased games of chance, generated by the central gaming system at a first time. The remote gaming device 20 further includes a housing 22 supporting a display screen 34, and one or more input mechanisms 46. A gaming device microprocessor device 52 is included which is configured to: 1) commence play or processing of the pre-viewed gaming data; and 2) selectively displaying on the display screen 34 the play and outcome of the one or more game of chance at a time-shifted second time, after the first time.

Accordingly, in this aspect of the present invention, one or more games of chance are pre-purchased and pre-executed on the central gaming system 120 (e.g., a backend server), at a first time, the play and outcome of which can subsequently played and viewed on the remote gaming device 20 at a second time, after the first time. The pre-purchased games of chance, thus, are fully executed in a secure gaming environment or system (e.g., the central gaming system 120), and then transferred, in the form of pre-viewed gaming data, to the remote gaming device for a complete replay execution of the play and outcome of the games of chance at the player's leisure on their remote gaming device. In essence, the play and outcome of the pre-purchased games of chance are "known" and ratified at the server side prior to play and viewing on the gaming device. Once the pre-viewed gaming data is transferred to the remote gaming device 120, the gaming device is simply applied to view the play and outcomes of the games of chance. Hence, in the most basic level, a video clip (or clips) of the gaming play and outcome is transferred or downloaded to the mobile gaming device from the server for time-shifted replay thereof at the second time. The gaming device is essentially relegated to a viewing mechanism that eliminates any player input, other than perhaps just pressing a button to enable one to view what happens in the next 'frame sequence' of the video clip. For Example, a plurality of gaming video clips may be pre-generated at the server/backend, at the first time. When a patron purchases one or more pre-generated games for viewing at the later second time, this data may be allocated (say randomly) to the gaming device in no set order, sequence, etc. The mobile gaming device merely plays the video clips, which relate to an event that had already occurred in a secure environment, at the first time. To the player, however, this aspect is unknown and likely of little interest.

This approach significantly reduces the prospect of tampering since the sequential "play" and "outcome", merely in the form of a video clip or session file, are well defined and logged by the server for payout and/or dispute resolution. The security issues, thus, are addressed from the server side. Accordingly, if be of little benefit for a hacker to "look-ahead" to determine which games may favorable since they are unable to "pick" and "choose" a winning video game.

In another aspect of the present invention, nonetheless, the post-viewed gaming data, representing the viewed play and outcomes of the one or more games of chance on the remote gaming device 20, is synced-up or reconciled with the pre-viewed gaming data stored on the central gaming system for authentication of the game results transferred from the gaming device. As will be apparent, such data authentication is desirable to significantly reduce the risk of data tampering to an even higher degree.

This form of remote gaming is extremely advantageous in that the viewing of the play and outcomes of the games of chance can be performed offline. Briefly, the offline component of play is performed when the remote gaming device 20 is not connected to the backend gaming system during game execution by the player of the mobile gaming device, while an online component of play is performed when pre-purchasing the games of chance, redeeming points, cashing and/or synchronizing with the backend gaming system for play reconciliation, etc. In this manner, all transactions would be performed within a legal casino jurisdiction.

Moreover, the present invention offers a standalone mobile gaming methodology and practice for full-offline game play (i.e., viewing of the play and outcome) without the need for connection through the internet, or any other network connection, or requirement that the player be physically present at the casino establishment during viewing of the play and outcome on the mobile gaming device. Accordingly, gaming on the mobile gaming device can be performed virtually anywhere, even though any type of network connection, such as cellular telephone network coverage, is unavailable.

Referring back to FIG. 10, this mobile gaming aspect of the present invention will now be described in greater detail. In accordance with the present invention, the entire mobile gaming system 116 includes a central gaming system 120 and one or more remote gaming devices 20. The central gaming system 120 typically includes a master gaming server 70 and a plurality of standalone gaming terminals (not shown) interconnected through a network system or the like. Briefly, while the central gaming system may comprise a large single server device, it is more preferably provided by a plurality of interconnect servers that cooperate to form the central gaming system. As set forth above in FIG. 3, for example, these may include the master gaming server 70, the financial server 68, the reservation server 72, an accounting server, etc. An accounting server, for instance, would be employed to ratify the various credit in/credit out transactions; validate credit card transactions and perform inter-credit facilitation transfers. The server may also allow credit transfer from a gaming device to a traditional device via system negotiation (master server to financial).

As set forth above in reference to FIG. 1, the remote gaming devices 20 include a housing 22, a display screen 34, one or more input devices 46, a microprocessor device 52, and internal memory 52 to execute gaming, i.e., viewing the play and outcome of the games of chance on the mobile gaming device. It will further be appreciated that while the remote gaming device is preferably a personal, mobile or portable gaming device, in this aspect of the present invention, it may also be a desktop computer, or a remote fixed or standalone gaming device as well. Preferably, however, the personal or mobile gaming devices include virtually any electronic communication unit such as a PDA, a cellular telephone, laptop computer, a dedicated mobile gaming device, etc.

While two-way communication between the central gaming system 120 and the mobile gaming devices 20, via communication interface 118, may be provided using the variety of I/O Device techniques already described herein (i.e., wireless interface, RS-232 port 38, USB port 40, etc.), the communication interface 118 (FIG. 11) is preferably freely removable from the mobile gaming device 20. In this aspect of the present invention, the communication interface may be provided by an intermediary, removable communication interface 118 capable receiving and transferring the pertinent pre-viewed game data necessary to perform standalone, off-line gaming between the central gaming system 120 and the mobile gaming devices 20 (FIG. 10).

The removable communication interface 118 can, in other words, interface with the central gaming system 120 through a system card reader device 121 located at any dedicated standalone card reader, player terminal or kiosk 119. Similarly, the removable communication interface 118 can interface with any mobile gaming device 20 through a like card reader device 50 thereof. By way of example, through the system card reader 121, the pre-viewed gaming data representing the play and outcome of the pre-purchased games of chance is downloaded to the removable communication interface 118 for storage on the memory unit thereof. The removable communication interface 118 may then be removed and inserted into the card reader 50 of the mobile gaming device 20, the gaming data of which can be extracted and processed at a selected second time for leisure viewing of the play and outcome of the pre-purchased game of chance. In one specific configuration, at the users leisure, the present invention enables time-shifted viewing of the play and outcome of the games of chance that were fully executed on the game server at an earlier first time.

The present invention, therefore, offers a standalone mobile gaming methodology and practice for full off-line game play execution without the need for a live connection through the internet or any other network connection. The player, in fact need not be physically present at the casino establishment during viewing of the play and outcome on the mobile gaming device. Gaming can thus be performed virtually anywhere, even though any type of network connection, such as cellular telephone network coverage, is unavailable.

The removable communication interface, hence, can in the most basic level be provided by a high capacity, portable memory unit capable of transferring the pre-viewed gaming data from the central gaming system 120 to the mobile gaming device 20 to effect time-shifted play and outcome, at the second time, and to transfer the post-viewed gaming data from the mobile gaming device back to the central gaming system for data reconciliation thereof. Such conventional memory units include, but are not limited to, compactflash modules, flash drives, memory sticks, smartcards, microdrives, etc.

More preferably, however, it is desirable to provide an intermediary, removable, communication interface 118 capable of increased functionality such as encrypting and decrypting usable data to reduce the risk of data tampering; performing player identity functions for player protection; and GPS location functionality to enable or not enable gaming operation in gaming legal jurisdictions. By way of example, as shown in FIG. 11, the communication interface 118 is preferably provided by a JAVA® based smartcard, E-key dongle, and other microcontroller systems, which incorporates a processor device and internal battery to enable the performance of the above-indicated functionality.

A conventional smartcard is a credit-card sized plastic card with an embedded computer chip 122. The chip 122 can be either a microprocessor with internal memory or a memory chip with non-programmable logic. The chip connection is either via direct physical contact or remotely via a contact less electromagnetic interface.

The chips typically applied in smartcards are microprocessor chips and memory chips. Memory chips are the less expensive of the two, but provide a corresponding decrease in data management security. They depend on the security of the card reader for their processing and are ideal when security requirements permit use of cards with low to medium security.

A microprocessor chip, on the other hand, can add, delete and otherwise manipulate information in its memory. Since the encryption and decryption of data is preferred to increase the security function of the smartcards, this chip is preferable. Their ability to download not just data but also applications is quickly advancing. JavaCard smartcards, by way of example, are based on Java technology from Sun Microsystems. Java is an object-oriented, platform-independent, multithreaded, programming environment. Java is the foundation for smart Web and networked services and allows for secure enterprise extension through platform independence. Different systems can talk to each other—from Java-based smartcards to supercomputers—regardless of the underlying hardware or system software.

In accordance with the present invention, the removable communication interface 118 preferably includes one or more security features to promote player authentication and proper locational based operation of the mobile gaming device. For example, the player may be required to enter a personal identification number before use of the interface can commence. In another embodiment, a player identification device 123 may be incorporated into the smartcard in the form of a biometric sensor capable of identifying the player. More particularly, the biometric sensor 123 may be a fingerprint sensor, a microphone, or the like.

In addition, the removable communication interface 118 may include a small GPS (Global Positioning System) sensor 124 to verify location of the device. Position verification may be used to insure the mobile gaming device 20 is being operated only in legal gaming jurisdictions, and to track lost or stolen devices. When the removable communication interface detects that the mobile gaming device is in a restricted area, or illegal gaming jurisdiction, the program logic may not permit data transfer or game execution to and from the removable communication interface.

GPS, which stands for Global Positioning System, is the one of the more accurate systems today capable of identifying the exact position of a GPS sensor on the Earth anytime, in any weather, anywhere. Briefly, using such a sensor, the location of the removable communication interface can be determine within a matter of meters. Other positioning technology includes triangulation techniques.

In another specific embodiment, the mobile gaming device can include a second or secondary communication interface, such as wireless communication interface 44 (FIG. 2), that enables communication with the central gaming system. This may include any wireless communication protocol such as IEEE 802.1x, Bluetooth, IrDA, TDMA, CDMA, GSM and HomeRF. The secondary communication interface may also be provided by any conventional hard wired I/O Device connection or port such as a USB port 40, RS-232 port 38 or a general I/O port.

As will be described in greater detail below, the secondary communication interface can be utilized to download larger software applications to the personal gaming device, such as firmware updates, advertising, video updates and control codes relating to the game presentation and game logic for viewing of the selected games of chance. On the other hand, all pre-viewed gaming data, affecting the play and outcome of the one or more games of chance on the mobile gaming device, and all post-viewed gaming data, for data reconciliation with the central gaming system, are preferably transferred through the intermediary, removable communication interface. It will be appreciated, however, that both communication interfaces can be applied if necessary.

Referring now to FIGS. 12A-12D, the general operation and application of this aspect of the present invention will be described. The gaming execution of this aspect of the present invention is considered passive in nature since the entire play session is generated by gaming server 70, at the first time, in the form of pre-viewed gaming data representing the play and outcome of the pre-purchased games of chance, and then downloaded to the mobile gaming device for viewing of the play and outcome at the later second time. The gaming data may in the form of a preset format such as a video clip or a game-presentation logic file such as an mpeg file. In the most basic form, video data relating to the gaming play and results are transferred or downloaded to the mobile gaming device from the server for time-shifted replay thereof at the second time. Consequently, this passive execution embodiment is substantially more secure in that there is significantly less potential for data tampering.

Figure 12A:
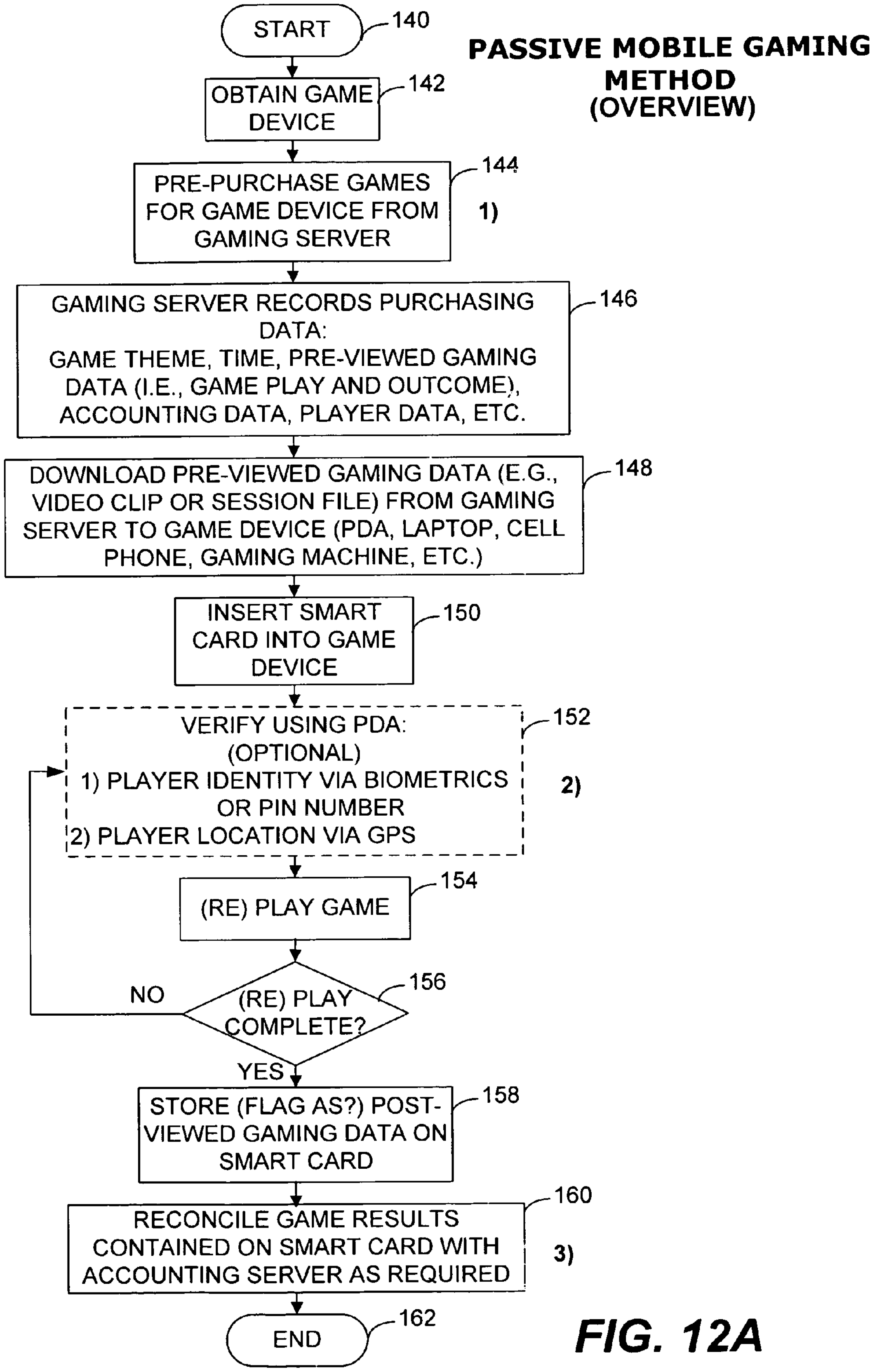
FIGS. 12A-12D are a series of block diagrams depicting a passive mobile gaming method for the gaming system of FIG. 10.

As best illustrated in FIGS. 10 and 12A, the operation commences at 140, where a player purchases, rents, leases, etc. a mobile gaming device 20, at 142, for use in connection with the mobile gaming system 116. Once the player opts to pre-purchase one or more games of chance at 144 for viewing on the mobile gaming device, the player may insert their issued removable communication interface 118 (e.g., smartcard) into a system card reader 121. Such card readers 121 are preferably in direct communication with the central gaming system 120, and may be located at the networked gaming terminals, or at standalone devices such as a kiosk 119 or the like. Briefly, in other specific embodiments, as mentioned, the gaming device 20 may also be connected to the gaming system by hard wiring directly to a player terminal or standalone kiosk, through any of the aforementioned wireless protocols (e.g., the secondary communication interface 44).

Upon insertion of the removable communication interface 118 into the system card reader 121, an initial login menu displays on a nearby display screen (not shown) of the player terminal or kiosk, prompting the player to input their selection commands. By way of example, the login menu may prompt the player to first enter a pin code, or other biometric identity information as discussed. Once these security measures have been satisfied, the player may elect to purchase on more games of chance by inputting the proper prompted information. As will be described in greater detail below, such pre-purchase game parameters may include selecting the number of games of chance desired for pre-purchase, and the type of video game, such as slot games, poker, pachinko, multiple hand poker games, pai-gow poker, black jack, keno, bingo, roulette, craps and card games. Other selectable pre-purchase parameters from the display menu at 144 may include total amount bet (e.g., total dollar amount of number of credits) or the currency denomination bet per game (e.g., $0.25 or number of credit bet per game). At a minimum, at 144, the player must select the game-type, and the number of games desired to be pre-purchased and/or the total amount desired to wager. This game pre-purchase procedure will be described in greater detail below in reference to the flow diagram of FIG. 12B.

Upon selection of the type of game, the number of games to be played, the denomination bet, etc., the play of each game is executed by the central server 70 to generate the pre-viewed gaming data. This data, in the form of an entire data session or video data, represents the entire game presentation, game play and game outcome of the pre-purchased games to be viewed in a time-shifted manner at a later second time.

For record keeping and reconciliation purposes to be conducted at a later time, the pre-viewed gaming data and all purchasing data is recorded on the gaming server 70 records, at 146. Included in the recordation of purchasing data by the central gaming system are: the game selection (e.g., game theme for Little Green Men); the game purchase time data (e.g., Purchased on 9/20/04. Gaming data expiration date (e.g., 3 months from date of purchase (not to be confused with the "first time" which corresponds to the time that the outcome of the last game of chance in this set of pre-purchased games is generated)): the selected game paytable data (e.g., IGT #1234 (paytable serial number, pre-approved by the Gaming Control Board for Little Green Men, 97% payback, 25-cent denomination, etc.)); the Accounting data (i.e., the total amount bet (e.g., $100 fee paid), and the Game denomination (e.g., $0.25). Also included in this recordation purchase, may be optional data such as the Player Identification data (e.g., John Smith, player ID #3456P, and Jurisdictional Control as required).

Upon completion of the purchasing data recordation, at 146, the pre-viewed gaming data is downloaded to the remote gaming device 20, at 148. As above-mentioned, the pre-viewed gaming data represents the game presentation of the play and outcome of the pre-purchased games of chance. Hence, this downloaded data may be in the form of a video clip of the same or a session file dictating the game presentation and logic gaming data that graphically depicts the play and outcome of the pre-purchased games of chance.

Such information would be necessary to incorporate on the mobile gaming device 20 in order to execute play, and generated and display the outcome and presentation on the mobile gaming device. Thus, the game presentation data and the game logic data corresponding to the selected game theme need not be transferred to the mobile gaming device 20 to effect viewing of the game play and outcome on the display since the gaming data transferred is merely in the form of a video clip, for instance. The amount of downloaded data, therefore, can be significantly reduced. More importantly, data tampering can be significantly curtailed since the downloaded data is essentially "video" data of the play and outcome, as opposed to "raw" data. Accordingly, there is little benefit a player altering the data.

Referring back to FIG. 12A, at 150, the removable communication interface 118 is inserted into the mobile gaming device 20 for transfer of the pre-viewed gaming data thereto from the gaming server. As mentioned, each mobile gaming device 20 includes a card reader 50 suitable for acceptance of the removable communication interface 118, whether it is in the form of a smartcard, an E-key dongle, Flash memory device, or direct download from a venue based machine.

As will be described in greater detail below, at 152 of FIG. 12A, an optional verification event can be required in one specific embodiment. Such use verification provides an additional measure of security requiring the input of player identity information and/or player location information to permit operational play on the mobile gaming device.

The player can then commence off-line operation of the mobile gaming device 20 for viewing of the pre-viewed gaming data, at virtually any venue, barring jurisdictional issues, and at any time. Through the player operation of the one or more input mechanisms 46 of the mobile gaming device 20, viewing of the play and outcome of one or more pre-purchased games of chance can commence. As mentioned, such execution and viewing of the play and outcome "video clip" of the games of chance shown on the display device of the mobile gaming device, the last of which is generated at the second time, after the first time. Accordingly, a time-shifted execution and viewing of the pre-purchased games can be performed virtually any place. At this time, the pre-viewed gaming data becomes post-viewed gaming data, a term of art in this instance for data reconciliation for essentially the same gaming data, unless altered. In other embodiments, after such viewing, the gaming data may be "flagged" as being viewed Referring back to FIG. 12A, after viewing of the play and outcome of each game, at 154, the mobile gaming device 20 determines whether viewing has been entirely completed, at 156. If any viewing of the pre-viewed gaming data still remains, then play may continued until all the remaining games have been exhausted on the mobile gaming device 20. If no game play remains, then the gaming device microprocessor device 52 is directed to store the post-viewed gaming data, at 158, back onto the removable communication interface 118

As mentioned above, to redeem their account and "settle-up" with the casino operation, especially in the event of a winning game session, the player or user must communicate the post-viewed gaming data back to the accounting server 68 of the central gaming system 120. This is performed by removing the removable communication interface 118 from the mobile gaming device card reader 50 and inserting it into one of the system card readers 121 capable of communicating with the accounting server 68 of the central gaming system 120. These card readers 121, for instance, may be located at the gaming terminals, or at designated kiosks. Briefly, other reconciliation techniques may include ratification by phone code, so generated by the PGD, internet access with a secret key (generated by the PGD) and/or voice ID over a phone system.

In accordance with the present invention, therefore, the post-viewed gaming data must be reconciled with the pre-viewed gaming data generated by and stored with the central gaming system 120, at 160. In this manner, the data can be authenticated to significantly minimize and/or deter the possibility of data tampering. Briefly, once the post-viewed gaming data is downloaded from the player's removable communication interface 118, via the system card reader 121, the accounting server 68 recalls the associated pre-viewed gaming data initially downloaded from the gaming server 70 to the player's removable communication interface 118.

Subsequently, after the system generated pre-viewed gaming data game play and outcome (i.e., the game results) are compared with the post-viewed gaming data transferred from the mobile gaming device 20 for data reconciliation thereof, the procedure ends at 162. Such data reconciliation, however, will be described in greater detail in reference to FIG. 12D.

Figure 12B:
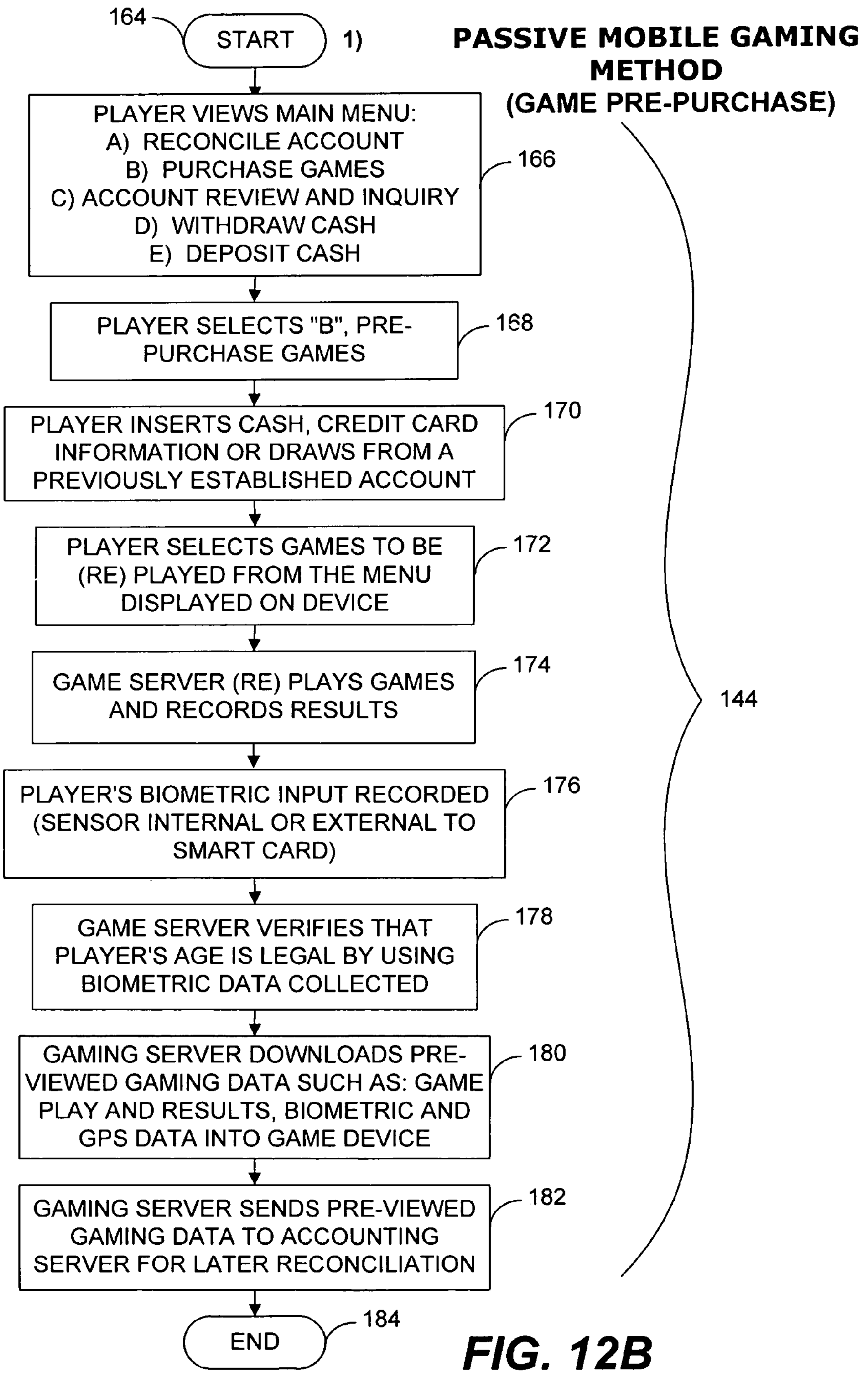

Attention is now directed to FIG. 12B, where the pre-purchase (144) of the one or more games of chance is discussed in greater detail for the passive mobile gaming method of FIG. 12A. As above-mentioned, the player may access the gaming server 70 of the central gaming system 120 at any kiosk, gaming terminal, etc., having a system card reader 121 and display screen coupled to the central gaming system 120. After commencement of the games pre-purchase at 164, a user friendly menu is displayed on the display screen, similar to that illustrated at 166. In this menu example, to pre-purchase one or more games of chance, the player would select "B", at 168.

At 170, the player is prompted to insert their player's removable communication interface 118 in the designated card reader 121 (e.g., at the kiosk) to establish communication with the gaming server 70. Briefly, at this stage, an optional identity verification procedure may be performed, similar to that at 152 of FIG. 12A. This event will be described in greater detail below.

Referring back to FIG. 12B, on the display screen of the player terminal or kiosk, the gaming server 70 may prompt the player to input the total wager amount desired by the player to wager. For example, the player may decide to wager a total of $100.00. In one specific embodiment, a maximum total amount wager limit may be applied for control wager control purposes such as those instituted by the Gaming Control Board, as well as for the self protection of the gaming player. These maximum wager limitations may be customized to the particular player based upon their past gaming activity, credit history, etc., similar to player tracking techniques.

Besides the input of the total wager bet, at 170, the player must typically select other certain parameters. For instance, the gaming server 70 may prompt the player to further input the currency denomination (e.g., $0.25), the number of games desired for pre-purchase and/or further input as may be required. Generally, given three (3) parameters selections, the fourth (4) can be derived. By way of example, if a fixed bet only configuration be selected or offered, the player may be prompted to selected the desired fixed denomination to bet, and the number of games for pre-purchase during the pre-purchase event of the present invention. Since the denomination bet per game will be fixed, the total wager amount will of course be the product of the fixed denomination bet and the number of games to be played. Alternatively, in these fixed bet configurations, during this pre-purchase event, the player may input the total wager amount and either the total number of games they elect to pre-purchase, thus determining the fixed bet amount, or the fixed bet amount, in which the total allowed games to play will be determined.

Subsequently, at 172 of FIG. 12B, the display screen of the kiosk or gaming terminal prompts the player to make payment for their total wager amount. Using conventional techniques, payment may be performed through cash insertion through a bill validator or coin acceptor, ATM, or credit card information input or swiping the card at a card reader located on the gaming machine or kiosk. Moreover, should the player have a player tracking account or account with the gaming establishment, they may simply withdraw the appropriate funds from the previously established account.

Once the payment has been made, at 172, the player may be prompted to select type of game of chance desired for game pre-purchase and play. For instance, at 174, the player may select slot games, poker, pachinko, multiple hand poker games, pai-gow poker, black jack, keno, bingo, roulette, craps and card game.

In more complex applications, however, more than one type of game may be selected for game pre-purchase. In these multi-game pre-purchase selections, whether applying fixed or variable betting, the parameter selections become even more complex in that player may divide their total wager bet per selected game, and then be prompted input the above-mentioned selection parameters. A menu, at 174, may prompt the player to select one or more of the available games. The player may select (via the touchscreen or via buttons) more than one game type, and the total wager amount they desire to bet per selected game type. For example, the player may desire a total wager of thirty dollars ($30) for Little Green Men; fifty dollars ($50) for Red White & Blue; and twenty dollars($20) for Triple Play Poker. In this multi-game selection embodiment, the menu selection order may not follow that shown in FIG. 12B. It will be appreciated, however, that while display and description of the methodology throughout the specification is in one particular order, this need not be the case. For example, as just mentioned, the game selections may be made before the wager amounts, etc., without departing from the true spirit and nature of the present invention.

Moreover, although the player may have input their total wager amount at 170, they are not required to bet their total wager amount input. In this situation, the player may have a credit meter or the like for their remaining total wager amount. For example, beginning with a hundred dollar ($100) total wager input at 170, if the player elected to play twenty (20) games, two (2) lines per game, and one dollar ($1.00) denomination bet for a total of forty dollars($40.00), they would have a surplus of sixty dollars ($60) that would be credited to their account.

Referring now to 176 and 178 of FIG. 12B, the player may be required to input their player identity to authenticate and verify proper use of the removable communication interface 118 during the game pre-purchase procedure. In this configuration, the identification sensor or device may be located at the kiosk or terminal, or on the removable communication interface. In other configurations, such player identity procedure may be performed at many other instances of the pre-purchase procedure. Regardless, this optional authentication and verification of the player, prior to completion of the game pre-purchase procedure, can be performed for security purposes. A more detailed description will follow in the Verification and Game Play procedure of FIG. 12C, since such system, features and procedures are similar.

Once all the required identification and security parameters have been satisfied, at 178 of FIG. 12B, the gaming server 70 immediately generates the play and outcomes for the one or more games of chance using Randomly Generated Numbers (RNG) generated by the gaming server and the game logic and presentation, etc. for the selected games. Preferably the entire session or video clip contained in the pre-viewed gaming data is generated and stored on the gaming server, prior to downloading onto the gaming device.

In other specific embodiments, packages of pre-generated games, in pre-viewed gaming data form, of any predetermined number (e.g., 10, 50, 100, etc.) may be available. Depending upon the number of games desired and/or package selected by the player, the server may randomly select one of perhaps 10,000 available packages of pre-generated games of one-hundred game. Hence, this selected package would contain pre-viewed gaming data of the play and outcome (video clips) of one-hundred games executed sequentially by the gaming server. Thus, in this embodiment, the generation of the pre-viewed gaming data is not just-in-time of the game purchase.

Such pre-generated packages may be available for download, even in situations where the player actually purchases less than then maximum number of games available in the package. For example, a package of fifty pre-generated games may be purchased, although the player only pre-purchases thirty games. In this instance, data tampering would be substantially curtailed since the purchased games would constitute the pre-viewed gaming data of the sequence of the first thirty games. Again, even if a hacker could "look ahead", they could not successfully change the sequence of the "video clip".

The generated pre-viewed gaming data is then downloaded to the gaming device at 180. Other optional data accessed that may be down loaded onto the gaming device, at 180, together with the pre-viewed gaming data include the biometric identification information, GPS location verification data, as well as any other pertinent player tracking information including advertising data.

Along with this pre-viewed gaming data presently generated or pre-generated, the corresponding paytable serial number for the one or more selected games, pre-approved by the Gaming Control Board, the percentage payback and the denominations accepted for betting, the game session accounting data can be calculated, as well. At 182, the gaming server 70 sends the pre-viewed gaming data, and all other pertinent gaming data to the accounting server 68. At the end of the pre-purchase of games, at 184, the system returns to 146 of FIG. 12A, where the relevant data is stored on the accounting server for subsequent data reconciliation thereof.

Referring back to 152 in FIG. 12A and FIG. 12C, the optional identity and location verification procedure can commence before play of the mobile gaming device 20. This player identity and location verification procedure is similar to that of game pre-purchase event 176 of FIG. 12B performed at the gaming terminal or kiosk during game pre-purchase. For example, as mentioned and as shown in FIG. 11, the removable communication interface 118 (in the form of a smartcard) optionally includes a biometric identification sensor 123, such as fingerprint recognition sensor, and/or a GPS sensor 124 or positioning device using last known positioning or triangulation.

A person's unique fingerprint offers a reliable and inexpensive means of authenticating an individual's identity. This is far more secure than personal identification numbers (PINs) or passwords which are subject to being compromised or forgotten. By linking the player directly to the transaction process through their fingerprint, proof is given that the authorized player is indeed present—not just someone who happens to know a short string of numbers or letter. This capability has been engineered by companies such as biometric Associates www.biometricassociates.com in Timonium, Maryland and fingerprint Cards AB www.fingerprint.se in Stockholm, Sweden into a complete, embeddable fingerprint identification system that can be inserted into a variety of access devices requiring player authentication. Their product performs all sensor, processor and decision-making functions within the module, greatly simplifying the incorporation of biometric recognition into small, mass-produced products such as smartcards and RFID tokens.

Briefly, in one example, one or more fingers of the player must first be registered so that the fingerprint sensor 123 on the removable communication interface 118 can recognize the fingerprint pattern. This is accomplished in conjunction with an external enrollment station that activates and controls the process. As the player places their fingertip on the fingerprint sensor 123, it detects and captures the small variations in finger surface-capacitance and creates a three-dimensional electrical image of the fingerprint's unique papillary pattern. These signals are verified and then programmed under the control of the enrollment station into protected memory on the communication interface 118. Such information may also be downloaded to the communication interface as part of the pre-viewed gaming data during the game pre-purchase procedure. Upon completion of the enrollment process and/or download of the pre-viewed gaming data, the module is "locked" and subsequent placement of any finger on the sensor triggers the verification process. This involves comparing the previously stored "registered" template with fingerprint image using a special programmed algorithm.

While the described biometric sensor device is incorporated into the removable communication interface, stand-alone fingerprint sensors available that can plug into PC's or laptop computers to provide fingerprint images. A greater description of a finger print reader as an identification device is also provided in co-owned U.S. Pat. No. 6,488,585, issued Dec. 3, 2002, by Wells, et al., entitled "Gaming Device Identification method and Apparatus," which is incorporated herein in its entirety and for all purposes. Other types of verification methods such as a PIN number or a password may be used separately or in combination with biometric identification methods. Other biometric identification methods that may be used with the present invention include but are not limited to feature identification using a camera, retinal pattern identification using a retinal scanner, voice pattern identification input using a microphone and hand-writing recognition using a hand writing input pad.

Figure 12C:
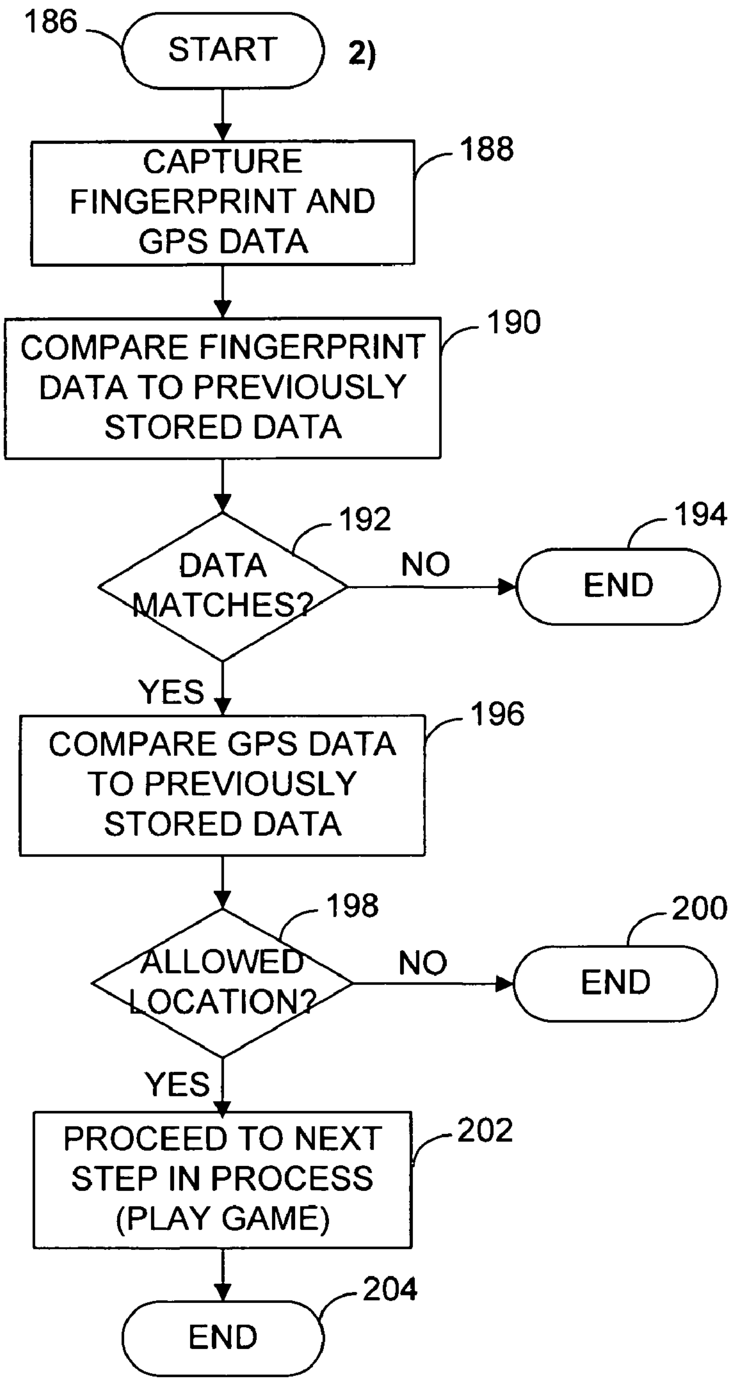

Accordingly, after the start of this verification procedure at 181 of FIG. 12C, the player may be required to first place their designated finger atop the finger print sensor 123 for capture of the fingerprint data at 188. As mentioned, the capacitive array sensor chip detects and captures small variations in finger surface capacitance and creates a three-dimensional electrical image of the fingerprint's unique pattern. Using the communication interface microprocessor, this three-dimensional image is then compared to that three-dimensional electrical image registered during the enrollment procedure, at 190. In the case of a fingerprint enabled smartcard, if the data does not match at 192, the player is locked out of use of the communication interface at 194. If the data results do match, at 192, the person holding the card (not just someone who happens to know the PIN) is verified as it's authorized player.

In addition, the mobile gaming device and/or the removable communication interface 118, as mentioned, may have a small GPS (Global Positioning System) device or sensor 124 to verify location of the device. Position verification may be used to insure the mobile gaming device is used only in legal gaming areas of the casino and to track lost or stolen devices. When the gaming terminal or kiosk detects that the mobile gaming device is in a restricted area, it may discontinue communications with the mobile gaming device. Accordingly, at 196, the GPS data calculated at the present position of use of the communication interface 118 can be compared to those jurisdictions were gaming is legal. Such information can also be downloaded onto the communication interface as part of the pre-viewed gaming data during the game pre-purchase procedure.

In the case of a GPS enabled smartcard, if the current position GPS data does not match at 198 with the legal jurisdiction GPS data, the player is locked out of use of the communication interface at 200. If the current position GPS data results do match, at 198, with the legal jurisdiction GPS data, potential use can commence. That is, once the fingerprint of the authorized player has been verified, and the legal gaming jurisdiction has been verified, the "smart chip" component on the card is automatically activated to proceed and establish protected communications with the host system, at 202.

For additional security, the mobile gaming device may have an encrypted serial number (code), which is used to verify and authenticate the mobile gaming device. An electronic key may be used with the device. With an electronic key system, the mobile gaming device can not be activated until the key is inserted into a receptacle on the gaming device. Moreover, in some instances, a player may not want their identity revealed for privacy protection. For those players desiring such anonymity, the player may be identified as a unique ID (e.g., player s/n 12345). This unique ID can be selected by the player, generated randomly by the central gaming system, or assigned as per the device. The player is then known to the secure financial server.

Many other forms of security may be applied as well. Those skilled in the art may implement other conventional security techniques known in the field to secure data without departing from the true spirit and nature of the present invention.

The game play on the mobile gaming device 20 will now be described in greater detail. As mentioned, once the player has satisfied all identity and jurisdictional verifications required by the removable communication interface 118, the player may commence play at 202 of FIG. 12C which corresponds to 154 of FIG. 12A. In accordance with the present invention, as indicated, the mobile gaming device 20 may optionally offer fixed betting and/or variable betting schemes. Either betting scheme, however, would have to be selected at the game pre-purchase, since the only interaction of the player, during viewing of the pre-viewed gaming data on the mobile gaming device is starting and stopping the viewing session. Hence, the betting schemes cannot be altered during viewing of the gaming data since, as mentioned, this is essentially a time-shifted event that has already been consummated.

Accordingly, to commence viewing of the play and outcome of the pre-viewed gaming data, at the second time, the player merely executes the "PLAY" input mechanism 46, either for each game or just once. Since the player is merely viewing a video clip, such as an mpeg file, of the play and outcome, the only player interaction may be to start and stop the viewing of the pre-viewed gaming data. For example, to simulate a slot game experience, one of the input buttons can represent the slot handle or spin buttons to commence spinning of the slot reels for each game. Once the reels stop and the game is over, the player may be required to activate the "play" button to commence viewing of the video clip. Other potential games requiring no player interaction that are suitable for viewing of the play and outcome in this manner included, but are not limited to, pachinko, keno, bingo, and roulette.

Incidentally, during the generation of the pre-viewed gaming data, the gaming server can graphically insert an accounting meter of the player's account into the video clip for display, in the same manner as the presentation of the play and outcome of the game. Again, this secure technique only transfers "video" data as opposed to "raw"0 data, and thus, significantly deters data tampering.

As indicated above, once the pre-viewed gaming data is actually viewed by the player at the second time, the gaming data will be flagged as being viewed by the player. Subsequently, this post-viewed gaming data is then stored on the removable communication interface 118, at 158 of FIG. 12A, for data reconciliation.

Figure 12D:
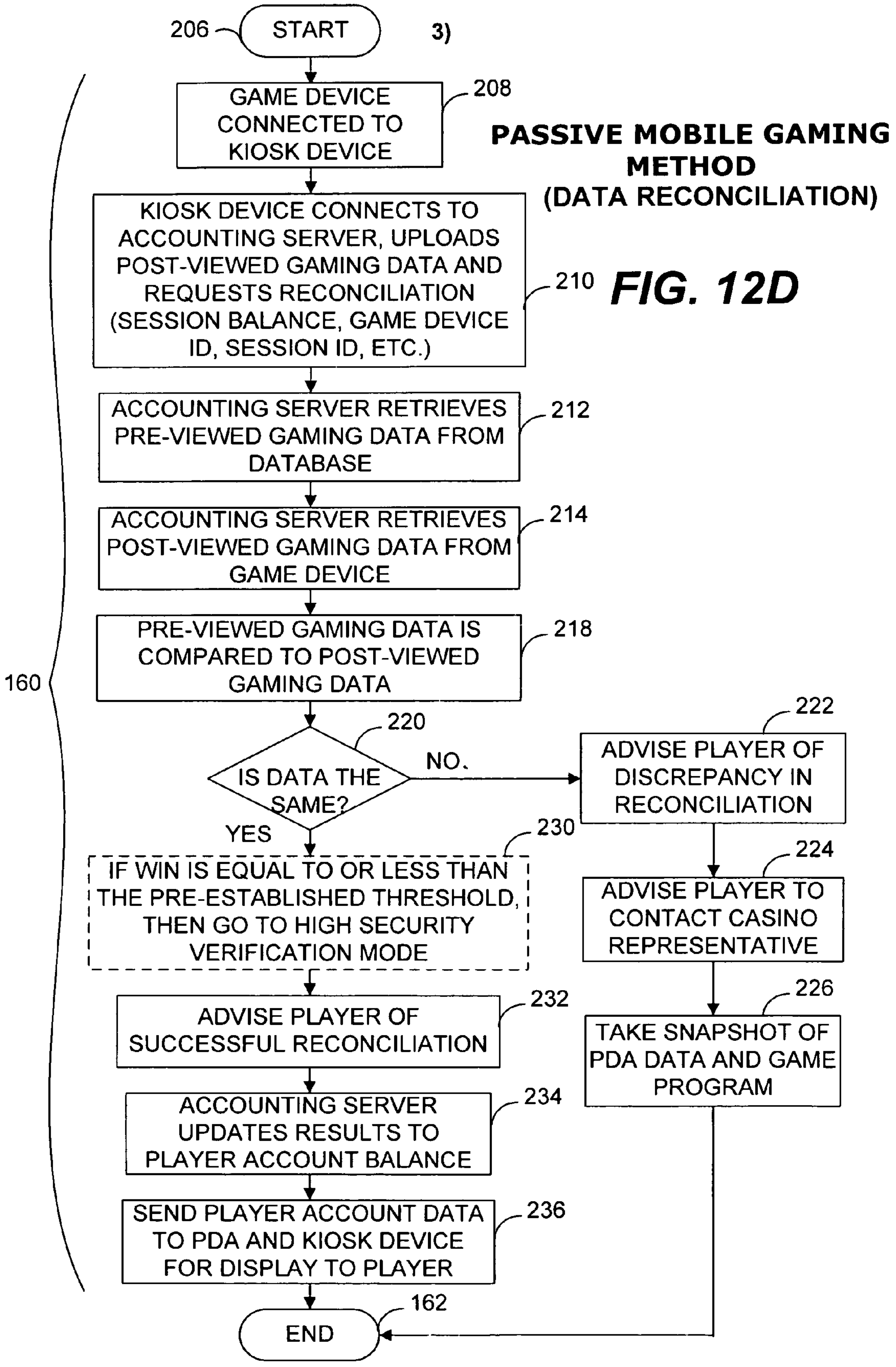

Turning now to the Data Reconciliation procedure of FIG. 12D, which commences at 206, the player initially inserts their removable communication interface 118 into the system card reader 121. As previously indicated in the game pre-purchase procedure and/or the game play procedure, the player may be required to input player identification data, at 152, such as a PIN number or other biometric information. After the identification and verification procedure are satisfied, communication is established between the kiosk or game terminal where the removable communication interface 118 is located.

At 208, the list of menu options, similar to 166 of FIG. 12B, is displayed on the display screen adjacent or near the system card reader 121. In this example, to reconcile their account, the player selects "A", in which the accounting server 68 begins upload of the post-viewed gaming data contained on the removable communication interface 118, at 210. As mentioned, this post-viewed gaming data should be the identical data, albeit flagged, as that of the pre-viewed gaming data.

Applying conventional data identification techniques, the accounting server 68, at 212, retrieves the corresponding pre-viewed gaming data that was originally downloaded to the removable communication interface during the game pre-purchase procedure at 180 of FIG. 12B. At 214, the post-viewed gaming data is uploaded and retrieved for reconciliation at 218. A comparator of the accounting server 68 then compares the previewed gaming data to the post-viewed gaming data for data discrepancies. Should a data discrepancy be detected, at 220, the accounting server 68 informs the player of the discrepancy during this reconciliation procedure, at 222. For example, an audible alarm may sound and/or inform the player on the kiosk of terminal display screen. The player may also be advised to contact a casino representative to determine the origin of the data discrepancy, at 224. For further security reasons, a snapshot of the mobile game device card data and game program may ensue, at 226.

If the comparator determines that the pre-viewed gaming data and the post-viewed gaming data are identical, at 220, the accounting server 68 determines whether the number of wins are equal to or less than the pre-established maximum theoretical number of wins, at 230. If this query, at 230, is positive, the accounting server 68 is placed in a higher security verification mode since an error has occurred and since a secure transaction is about to commence, i.e. updating play related/win information, at 234.

Should it be determined, at 230, that this is not the situation, the accounting server 68, at 232, informs the player of the successful data reconciliation procedure. The player's account balance is then updated at 234. At 236, this information is then forwarded to the kiosk or gaming terminal display where the player is using, and/or to the player's mobile gaming device 20 through the secondary communication interface 118. At 228, the operation for the mobile gaming procedure ends at 162.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A gaming system, comprising:
- a central gaming system configured to:
  - generate pre-viewed gaming data using a random number generator, the pre-viewed gaming data including game outcomes of games of chance that have not yet been displayed by a gaming device,
  - receive an input selection, the pre-viewed gaming data generated in response to receiving the input selection, and
  - store the pre-viewed gaming data; and
- the gaming device, the gaming device being physically separate from the central gaming system, the gaming device comprising:
  - a communication interface configured to communicate with the central gaming system, to transmit the input selection, and to receive the pre-viewed gaming data;
  - a display screen;
  - one or more input mechanisms;
  - a processing unit configured to:
    - accept instructions from the one of more input mechanisms to commence display of at least a portion of the pre-viewed gaming data,
    - display on the display screen the at least a portion of the pre-viewed gaming data, and
    - flag the displayed portion of the pre-viewed gaming data as viewed, the flagged pre-viewed gaming data constituting post-viewed gaming data; and
  - a biometric device, wherein the processing unit of the gaming device is further configured to verify player identity using the biometric device before display of the at least a portion of the pre-viewed gaming data, and wherein the verification identifies a player as the player authorized to view the pre-viewed gaming data;
- wherein the communication interface is further configured to transmit the post-viewed gaming data to the central gaming system;
- wherein the central gaming system is further configured to compare the post-viewed gaming data to the stored pre-viewed gaming data for authentication of the post-viewed gaming data.

2. The gaming system of claim 1, wherein the communication interface of the gaming device includes at least one of a hard wired communication interface, an intermediary communication interface, and a wireless communication interface.

3. The gaming system of claim 2, wherein the wireless communication interface includes a wireless communication protocol selected from the group consisting of IEEE 802.1x, Bluetooth, IrDA, TDMA, CDMA, GSM, and HomeRF.

4. The gaming system of claim 2, wherein the intermediary communication interface includes a removable peripheral device configured for communication between the gaming device and the central gaming system, the removable peripheral device configured to transfer at least a portion of the pre-viewed and post-viewed gaming data there between.

5. The gaming system of claim 4, wherein the removable peripheral device includes a peripheral processor device and a storage medium to store the at least a portion of the pre-viewed and the post-viewed gaming data.

6. The gaming system of claim 5, wherein the removable peripheral device is selected from the group consisting of a smartcard, an E-key dongle, a memory stick, and a Secure Digital card.

7. The gaming system of claim 1, wherein the processing unit of the gaming device is further configured to:
- accept instructions from the one or more input mechanisms to generate the input selection.

8. The gaming system of claim 1, wherein the communication interface of the gaming device includes a wireless communication interface having a wireless communication protocol selected from the group consisting of IEEE 802.1x, Bluetooth, IrDA, TDMA, CDMA, GSM, and HomeRF.

9. The gaming system of claim 1, wherein the games of chance are selected from the group consisting of slot games, poker, pachinko, multiple hand poker games, pai-gow poker, black jack, keno, bingo, roulette, craps and card games.

10. The gaming system of claim 1, wherein the gaming device comprises a portable gaming device.

11. The gaming system of claim 1, wherein the pre-viewed gaming data includes at least two game outcomes of two games of chance.

12. The gaming system of claim 11, wherein the processing unit of the gaming device is further configured to:
- accept instructions from the one or more input mechanisms to display the at least two game outcomes in a selected order.

13. The gaming system of claim 11, wherein the processing unit of the gaming device is further configured to:
- accept instructions from the one or more input mechanisms to display the game outcomes of the two or more games of chance in accordance with a category of outcomes of the two or more games of chance.

14. The gaming system of claim 13, wherein the category of outcomes includes winning outcomes and losing outcomes.

15. The gaming system of claim 1, the gaming device further comprising:
- a memory unit configured to store the pre-viewed gaming data.

16. The gaming system of claim 1, wherein the pre-viewed gaming data is in the form of video data.

17. The gaming system of claim 16, wherein the video data is in the form of an mpeg file.

18. The gaming system of claim 1, wherein the one or more input mechanisms of the gaming device are selected from the group consisting of a touch screen, an input switch, and an input button.

19. The gaming system of claim 1, wherein the processing unit of the gaming device is further configured to:
- automatically receive the pre-viewed gaming data.

20. A method, comprising:
- receiving an input selection from a portable gaming device at a central gaming system, the portable gaming device being physically separate from the central gaming system;
- generating a number of game outcomes in response to receiving the input selection, wherein the number of game outcomes are generated using a random number generator, a game outcome including an outcome of a game of chance;
- storing the number of game outcomes as pre-viewed gaming data on the central gaming system, wherein the pre-viewed gaming data includes at least one game outcome that has not yet been displayed by the portable gaming device;

communicating the pre-viewed gaming data to the portable gaming device;

receiving post-viewed gaming data from the portable gaming device, the post-viewed gaming data comprising flagged pre-viewed gaming data, wherein pre-viewed gaming data is flagged as viewed after being displayed on the portable gaming device after verification of player identify using a biometric device to identify a player as the player authorized to play games; and comparing the post-viewed gaming data from the portable gaming device to the stored pre-viewed gaming data for authentication of the post-viewed gaming data.

21. The method of claim 20, wherein the communicating includes communicating the pre-viewed gaming data through a removable communication interface configured for communication between the central gaming system and the portable gaming device.

22. The method of claim 21, wherein the communicating includes receiving the removable communication interface in a reader device coupled to the central gaming system.

23. The method of claim 22, wherein the communicating further includes storing, via the reader device, the pre-viewed gaming data onto a storage unit of the removable communication interface, and the receiving post-viewed gaming data includes retrieving, via the reader device, the post-viewed gaming data from the storage unit of the removable communication interface.

24. The method of claim 22, wherein the removable communication interface is configured to be mounted to the central gaming system.

25. The method of claim 24, wherein the removable communication interface is selected from the group consisting of a smartcard, an E-key dongle, a memory stick, and a Secure Digital card.

26. The method of claim 20, wherein the input selection includes at least two of a total amount wagered, a denomination per game wagered, and a number of games of chance.

27. The method of claim 20, further comprising:

after the generating the number of game outcomes, storing the input selection.

28. The method of claim 25, wherein the pre-viewed and the post-viewed gaming data are in the form of video data.

29. The method of claim 28, wherein the video data is in the form of an mpeg file.

30. The method of claim 25, further comprising after generating the number of game outcomes, encrypting the pre-viewed gaming data.

31. A method, comprising:

transmitting an input selection from a portable gaming device to a central gaming system, the portable gaming device being physically separate from the central gaming system;

receiving on the portable gaming device pre-viewed gaming data, the pre-viewed gaming data generated by the central gaming system using a random number generator in response to receiving the input selection from the portable gaming device, the pre-viewed gaming data including at least one game outcome of one game of chance that has not yet been displayed by the portable gaming device, the pre-viewed gaming data being stored on the central gaming system;

receiving input instructions from one or more input mechanisms of the portable gaming device to commence display of at least a portion of the pre-viewed gaming data;

verifying player identity using a biometric device before display of the at least a portion of the pre-viewed gaming data, wherein the verification identifies a player as the player authorized to view the pre-viewed gaming data;

displaying the at least a portion of the pre-viewed gaming data on a display screen of the portable gaming device;

flagging the displayed portion of the pre-viewed gaming data as viewed, the flagged pre-viewed gaming data constituting post-viewed gaming data; and transmitting the post-viewed gaming data to the central gaming system, wherein the central gaming system is configured to compare the post-viewed gaming data to the stored pre-viewed gaming data for authentication of the post-viewed gaming data.

32. The method of claim 31, wherein the receiving pre-viewed gaming data and the transmitting the post-viewed data is performed through a removable communication interface configured to enable communication of the portable gaming device with the central gaming system.

33. The method of claim 32, further including:

receiving the removable communication interface in a reader device of the portable gaming device for the receiving and the transmitting of the pre-viewed and post-viewed gaming data.

34. The method of claim 33, wherein the receiving the pre-viewed gaming data includes retrieving, via the reader device, the pre-viewed gaming data from a storage unit of the removable communication interface, and the transmitting the post-viewed gaming data includes storing, via the reader device, the post-viewed gaming data onto the storage unit of the removable communication interface.

35. The method of claim 33, wherein the removable communication interface is selected from the group consisting of a smartcard, an E-key dongle, a memory stick, and a Secure Digital card.

36. A method, comprising:

receiving an input selection from a portable gaming device at a central gaming system, the portable gaming device being physically separate from the central gaming system;

generating a number of game outcomes in response to receiving the input selection, wherein the number of game outcomes are generated using a random number generator, a game outcome including the outcome of a game of chance;

storing the number of game outcomes as pre-viewed gaming data, the pre-viewed gaming data not yet having been displayed by the portable gaming device, on the central gaming system;

communicating the pre-viewed gaming data to a removable communication interface;

receiving post-viewed gaming data from the removable communication interface, the post-viewed gaming data comprising flagged pre-viewed gaming data, wherein the pre-viewed gaming data is flagged as viewed after being displayed on the portable gaming device, wherein player identity is verified using a biometric device before display of the pre-viewed gaming data, and wherein the verification identifies a player as the player authorized to view the pre-viewed gaming data; and comparing the post-viewed gaming data to the stored pre-viewed gaming data for authentication of the post-viewed gaming data.

37. The method of claim 36, further comprising:

retrieving the post-viewed gaming data from the removable communication interface to the central gaming system.

38. The method of claim 37, wherein the communicating the pre-viewed gaming data includes storing, via a reader device coupled to the central gaming system, the pre-viewed gaming data onto a storage unit of the removable communication interface, and wherein the retrieving post-viewed gaming data includes retrieving, via the reader device, the post-viewed gaming data from the storage unit of the removable communication interface.

39. The method of claim 36, wherein the pre-viewed and the post-viewed gaming data are in the form of video data.

40. The method of claim 36, further comprising:

after generating the number of game outcomes, encrypting the pre-viewed gaming data.

41. The gaming system according to claim 1, wherein the central gaming system further includes at least one of a gaming server, a financial server, an accounting server, and a player tracking server.

42. The method of claim 20, wherein the communicating includes communicating the pre-viewed gaming data using a wireless communication protocol.

43. The method of claim 31, wherein the transmitting the input selection, the receiving the pre-view gaming data, and the transmitting the post-view gaming data is performed using a wireless communication protocol.

44. A gaming device, the gaming device comprising:

a communication interface configured to communicate with a central gaming system to transmit an input selection to the central gaming system and to receive pre-viewed gaming data generated by the central gaming system, the pre-viewed gaming data including game outcomes of games of chance that have not yet been displayed by the gaming device, the gaming device being physically separate from the central gaming system;

a display screen;

one or more input mechanisms;

a biometric device; and a processing unit configured to:

accept instructions from the one of more input mechanisms to commence display of at least a portion of the pre-viewed gaming data, verify player identity using the biometric device before display of the at least a portion of the pre-viewed gaming data, wherein the verification identifies a player as the player authorized to view the pre-viewed gaming data, display on the display screen the at least a portion of the pre-viewed gaming data, and flag the displayed portion of the pre-viewed gaming data as viewed, the flagged pre-viewed gaming data constituting post-viewed gaming data;

the communication interface further configured to transmit the post-viewed gaming data to the central gaming system for authentication of the post-viewed gaming data.

45. The gaming device of claim 44, wherein the communication interface includes at least one of a hard wired communication interface, an intermediary communication interface, and a wireless communication interface.

46. The gaming device of claim 44, wherein the processing unit is further configured to:

accept instructions from the one or more input mechanisms to generate the input selection.

47. A central gaming system, the central gaming system comprising:

a random number generator, the random number generator configured to generate pre-viewed gaming data, the pre-viewed gaming data including game outcomes of games of chance that have not yet been displayed by a gaming device, the pre-viewed gaming data generated in response to receiving an input selection, the gaming device being physically separate from the central gaming system, the gaming device including a biometric device, wherein player identity is verified using the biometric device before display of the pre-viewed gaming data, and wherein the verification identifies a player as the player authorized to view the pre-viewed gaming data;

a memory device, the memory device configured to store the pre-viewed gaming data;

a communication interface configured to communicate with the gaming device to receive an input selection from the gaming device, to transmit the pre-viewed gaming data to the gaming device, and to receive post-viewed gaming data from the gaming device, the post-viewed gaming data including portions of the pre-viewed gaming data displayed at the gaming device; and a processor, the processor configured to compare the post-viewed gaming data to the stored pre-viewed gaming data for authentication of the post-viewed gaming data.

48. The central gaming system of claim 47, wherein the communication interface includes at least one of a hard wired communication interface, an intermediary communication interface, and a wireless communication interface.

49. The central gaming system of claim 47, wherein the pre-viewed gaming data is in the form of video data.

* * * * *

UNITED STATES PATENT AND TRADEMARK OFFICE

CERTIFICATE OF CORRECTION

PATENT NO. : 8,087,988 B2
APPLICATION NO. : 10/871876
DATED : January 3, 2012
INVENTOR(S) : Nguyen et al.

It is certified that error appears in the above-identified patent and that said Letters Patent is hereby corrected as shown below:

CLAIMS:

Column 35, Line 42, (In line 1) of claim 28 (renumbered) the dependency claim "25" should be "20".

Signed and Sealed this
Eighth Day of May, 2012

David J. Kappos

David J. Kappos
*Director of the United States Patent and Trademark Office*